United States Patent
Riman et al.

(10) Patent No.: US 10,266,448 B2
(45) Date of Patent: Apr. 23, 2019

(54) BONDING ELEMENT, BONDING MATRIX AND COMPOSITE MATERIAL HAVING THE BONDING ELEMENT, AND METHOD OF MANUFACTURING THEREOF

(71) Applicant: Rutgers, The State University of New Jersey, New Brunswick, NJ (US)

(72) Inventors: Richard E. Riman, Belle Mead, NJ (US); Surojit Gupta, Highland Park, NJ (US); Vahit Atakan, West Windsor, NJ (US); Qinghua Li, Edison, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 273 days.

(21) Appl. No.: 15/097,963

(22) Filed: Apr. 13, 2016

(65) Prior Publication Data
US 2017/0044061 A1     Feb. 16, 2017

Related U.S. Application Data

(62) Division of application No. 13/411,218, filed on Mar. 2, 2012, now Pat. No. 9,868,667.

(Continued)

(51) Int. Cl.
     *B32B 3/10*          (2006.01)
     *C04B 14/46*       (2006.01)
     *C04B 14/04*       (2006.01)
     *C04B 20/12*       (2006.01)
     *C04B 28/04*       (2006.01)
(Continued)

(52) U.S. Cl.
CPC .......... *C04B 14/465* (2013.01); *C04B 14/043* (2013.01); *C04B 20/1074* (2013.01); *C04B 20/12* (2013.01); *C04B 28/04* (2013.01); *C04B 28/10* (2013.01); *C04B 28/188* (2013.01); *C04B 2111/2015* (2013.01); *C04B 2111/29* (2013.01);
(Continued)

(58) Field of Classification Search
None
See application file for complete search history.

(56) References Cited

U.S. PATENT DOCUMENTS

| | | |
|---|---|---|
| 3,632,624 A | 1/1972 | Anderson |
| 4,350,567 A | 9/1982 | Moorehead et al. |

(Continued)

FOREIGN PATENT DOCUMENTS

| | | |
|---|---|---|
| BE | 1006908 A3 | 1/1995 |
| EP | 1142629 A1 | 10/2001 |

(Continued)

OTHER PUBLICATIONS

Riman et al. "Hydrothermal Crystallization of Ceramics", Ann. Chim. Sci. Mat., 2002, vol. 27, No. 6, pp. 15-36.

(Continued)

*Primary Examiner* — Christopher M Polley
(74) *Attorney, Agent, or Firm* — Dentons US LLP

(57) ABSTRACT

A bonding element, a bonding element matrix and composite materials with a wide range of attractive properties that may be optimized, including, but not limited to, mechanical properties, thermal properties, magnetic properties, optical properties and nuclear properties, as a result of a first layer and second layer structure or core, first layer, and second layer structure of the bonding elements, as well as methods for making the bonding elements and the corresponding ceramic and/or composite materials.

26 Claims, 25 Drawing Sheets

Related U.S. Application Data

(60) Provisional application No. 61/449,659, filed on Mar. 5, 2011.

(51) Int. Cl.
  *C04B 28/10*  (2006.01)
  *C04B 20/10*  (2006.01)
  *C04B 28/18*  (2006.01)
  C04B 111/20  (2006.01)

(52) U.S. Cl.
  CPC .................. *Y10T 428/24851* (2015.01); *Y10T 428/249953* (2015.04)

(56) References Cited

U.S. PATENT DOCUMENTS

| | | | |
|---|---|---|---|
| 4,501,618 | A | 2/1985 | Gebhard et al. |
| 4,528,149 | A | 7/1985 | Wichelhaus |
| 4,595,465 | A | 6/1986 | Ang et al. |
| 5,252,127 | A | 10/1993 | Pichat |
| 5,298,475 | A | 3/1994 | Shibata et al. |
| 5,395,561 | A | 3/1995 | Ukawa et al. |
| 5,449,533 | A | 9/1995 | Morizane |
| 5,502,021 | A | 3/1996 | Schuster |
| 5,518,540 | A | 5/1996 | Jones, Jr. |
| 5,650,562 | A | 7/1997 | Jones, Jr. |
| 5,769,940 | A | 6/1998 | College |
| 5,779,464 | A | 7/1998 | Fan et al. |
| 5,830,815 | A | 11/1998 | Wagh et al. |
| 5,897,702 | A | 4/1999 | Thomson et al. |
| 5,958,353 | A | 9/1999 | Eyal |
| 5,965,201 | A | 10/1999 | Jones, Jr. |
| 5,987,704 | A | 11/1999 | Tang |
| 5,997,629 | A | 12/1999 | Hills |
| 6,271,172 | B2 | 8/2001 | Ohashi et al. |
| 6,447,437 | B1 | 9/2002 | Lee et al. |
| 6,648,551 | B1 | 11/2003 | Taylor |
| 6,787,023 | B1 | 9/2004 | Mohr et al. |
| 7,067,456 | B2 | 6/2006 | Fan et al. |
| 7,125,530 | B2 | 10/2006 | Biedenkopf et al. |
| 7,132,090 | B2 | 11/2006 | Dziedzic et al. |
| 7,141,093 | B2 | 11/2006 | Charette |
| 7,314,847 | B1 | 1/2008 | Siriwardane |
| 7,390,444 | B2 | 6/2008 | Ramme et al. |
| 7,399,339 | B2 | 7/2008 | Fan et al. |
| 7,618,606 | B2 | 11/2009 | Fan et al. |
| 7,666,374 | B2 | 2/2010 | Grochowski |
| 7,670,679 | B2 | 3/2010 | Krishna et al. |
| 7,722,842 | B2 | 5/2010 | Park et al. |
| 7,753,618 | B2 | 7/2010 | Constantz et al. |
| 7,795,175 | B2 | 9/2010 | Olah et al. |
| 7,820,591 | B2 | 10/2010 | Ryu et al. |
| 2002/0091059 | A1 | 7/2002 | Venigalla et al. |
| 2004/0131531 | A1 | 7/2004 | Geerlings et al. |
| 2004/0213705 | A1 | 10/2004 | Blencoe et al. |
| 2006/0185560 | A1 | 8/2006 | Ramme et al. |
| 2006/0216512 | A1 | 9/2006 | Fujikawa et al. |
| 2007/0020955 | A1 | 1/2007 | Song et al. |
| 2007/0149398 | A1 | 6/2007 | Jones et al. |
| 2008/0245274 | A1 | 10/2008 | Ramme |
| 2009/0020044 | A1 | 1/2009 | Constantz et al. |
| 2009/0081093 | A1 | 3/2009 | Comrie |
| 2009/0104349 | A1 | 4/2009 | Hills et al. |
| 2009/0142578 | A1 | 6/2009 | Riman et al. |
| 2009/0143211 | A1 | 6/2009 | Riman et al. |
| 2009/0304566 | A1 | 12/2009 | Golden et al. |
| 2010/0024686 | A1 | 2/2010 | Constantz et al. |
| 2010/0132549 | A1 | 6/2010 | Yaghi et al. |
| 2010/0132591 | A1 | 6/2010 | Constantz et al. |
| 2010/0135882 | A1 | 6/2010 | Constantz et al. |
| 2010/0247410 | A1 | 9/2010 | Constantz et al. |

FOREIGN PATENT DOCUMENTS

| | | | | |
|---|---|---|---|---|
| EP | 2 525 896 | A1 | 11/2012 | |
| JP | 2001253785 | A | 9/2001 | |
| JP | 2001 278679 | A | 10/2001 | |
| JP | 2001 302295 | A | 10/2001 | |
| JP | 2004-026629 | A | 1/2004 | |
| JP | 3653523 | B2 | 5/2005 | |
| JP | 3749648 | B2 | 3/2006 | |
| JP | 2006213559 | | 8/2006 | |
| WO | 2000038910 | A1 | 7/2000 | |
| WO | 2005070521 | A1 | 8/2005 | |
| WO | 2007106883 | A2 | 9/2007 | |
| WO | 2009/132692 | A1 | 11/2009 | |
| WO | 2009132692 | A1 | 11/2009 | |
| WO | 2009133120 | A2 | 11/2009 | |
| WO | WO 2009132692 | A1 | 11/2009 | ............ C04B 28/10 |
| WO | 2012/170667 | A1 | 12/2012 | |

OTHER PUBLICATIONS

Monkman et al., "Assessing the Carbonation Behavior of Cementitious Materials", Journal of Materials in Civil Engineering, Nov. 2006, pp. 768-776.
Monkman et al., "Carbonated Ladle Slag Fines for Carbon Uptake and Sand Substitute", Journal of Materials in Civil Engineering, Nov. 2009, pp. 657-665.
Monkman et al., "Carbonation Curing of Slag-Cement Concrete for Binding CO2 and Improving Performance", Journal of Materials in Civil Engineering, Apr. 2010, pp. 296-304.
Liu et al., "Development of CO2 solidification method for recycling autoclaved lightweight concentrate waste", Journal of Material Science Letters in Civil Engineering, 2001, pp. 1791-1794.
Teramura et al, "New Building Material from Waste Concrete by Carbonation", Journal of Material Civil Engineering, Nov. 2000, pp. 288-293.
Shiomi et al., " Effect of Mechano-Chemical Treatment on Consolidation of CaSiO3 by Carbonation", J. Soc. Mat. Sci., Japan, vol. 51, No. 6, pp. 610-616, Jun. 2002.
Nakamura et al., "High Temperature Deformation and Dislocation Structure of a-Al2O3 Single Crystals", J. Soc. Mat. Sci., Japan, vol. 51, No. 6, pp. 617-621, Jun. 2002.
SciFinder Scholar database searched under "Cement-Carbonate-Carbon Dioxide", Jun. 29, 2007 pp. 1-993.
SciFinder Scholar database searched under "Hydrothermal Sintering", Aug. 23, 2007 pp. 1-16.
SciFinder Scholar database searched under "Carbon Dioxide in Cement", Oct. 10, 2007 pp. 1-2.
SciFinder Scholar database searched under "Cements/Geopolymers_Czech", Oct. 10, 2007 pp. 1-5.
SciFinder Scholar database searched under "Geopolymers and Carbon Dioxide", Oct. 10, 2007 pp. 1-8.
SciFinder Scholar database searched under "Geopolymers", Oct. 10, 2007 pp. 1-9.
SciFinder Scholar database searched under "Carbon Capture and Amine Sorbents", Jan. 3, 2008, pp. 1-70.
SciFinder Scholar database searched under "Carbon Capture and Calcium Carbonate", Jan. 3, 2008, pp. 1-31.
SciFinder Scholar database searched under "Carbon Capture and Calcium Sulfate", Jan. 3, 2008, pp. 1-6.
SciFinder Scholar database searched under "Carbon Capture and Ammonium Carbonate", Jan. 3, 2008, pp. 1-4.
SciFinder Scholar database searched under "C02 Capture, Carbonates and Chloride", Jan. 3, 2008, pp. 1-13.
SciFinder Scholar database searched under "Carbon Capture and Carbonates", Jan. 3, 2008, pp. 1-88.
SciFinder Scholar database searched under "Carbon Capture and FeCO3", Jan. 3, 2008, pp. 1-2.
SciFinder Scholar database searched under "Carbon Capture and Hydrothermal", Jan. 3, 2008, pp. 1-3.
SciFinder Scholar database searched under "Carbon Capture and Oxalate", Jan. 3, 2008, pp. 1-2.

(56) References Cited

OTHER PUBLICATIONS

SciFinder Scholar database searched under "Carbon Capture and Sequestration", Jan. 3, 2008, pp. 1-132.
SciFinder Scholar database searched under "Carbon Capture and Sintering", Jan. 3, 2008, pp. 1-61.
SciFinder Scholar database searched under "Carbon Capture and solid sorbents", Jan. 3, 2008, pp. 1-32.
SciFinder Scholar database searched under "Carbon Capture and Storage", Jan. 3, 2008, pp. 1-128.
SciFinder Scholar database searched under "Carbon Capture and MgC03", Jan. 4, 2008, pp. 1-3.
SciFinder Scholar database searched under "Oxalate-electrochemical", Jan. 14, 2008, pp. 1-2.
SciFinder Scholar database searched under "Oxalate for Sequestration", Jan. 14, 2008, pp. 1-4.
SciFinder Scholar database searched under "Oxalate—Texaco", Jan. 14, 2008, pp. 1-4.
SciFinder Scholar database searched under "Solar Oxalate", Jan. 14, 2008, pp. 1-2.
SciFinder Scholar database searched under "Carbonation of Concrete, restricted to 2000 and on", Jan. 21, 2008, pp. 1-417.
SciFinder Scholar database searched under "Slag and Carbon Dioxide", Jun. 17, 2008, pp. 1-768.
SciFinder Scholar database searched under "Slags—Carbon Dioxide—Construction Materials", Jun. 17, 2008, pp. 1-95.
SciFinder Scholar database searched under "Lime Cement—Carbon Dioxide", Jul. 2, 2008, pp. 1-98.
SciFinder Scholar database searched under "Hills—all papers", Nov. 30, 2010, pp. 1-27.
SciFinder Scholar database searched under "Hills", Nov. 30, 2010, pp. 1-13.
SciFinder Scholar database searched under "Teramura limited to carbonate", Nov. 30, 2010, pp. 1-11.
SciFinder Scholar database searched under "Teramura Work", Nov. 30, 2010, pp. 1-34.
SciFinder Scholar database searched under "Carbon Capture and Amine and MEA", Jan. 3, 2008, pp. 1-20.
SciFinder Scholar database searched under "Carbon Capture and K2CO3", Jan. 3, 2008, pp. 1-12.
SciFinder Scholar database searched under "Carbon Capture Na2CO3", 101/03/2008, pp. 1-15.
SciFinder Scholar database searched under "Solidification of McC03", Jan. 4, 2008, pp. 1-2.
Klaus S. Lackner, "Carbon dioxide disposal in carbonate minerals", Energy Pergamon Press, Oxford, GB, vol. 20, No. 11, Jan. 1, 1995.
D. Davel et al: "Mechanism of wollastonite carbonation deduced from micro- to nanometer length scale observations", The American Mineralogist, vol. 94, No. 11-12, Nov. 1, 2009 (Nov. 1, 2009), pp. 1707-1726.

FIG. 14(a)
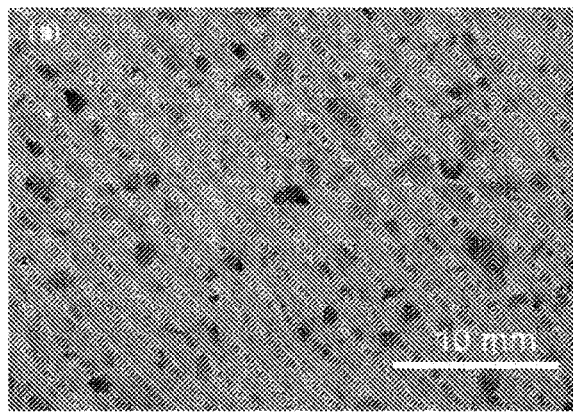
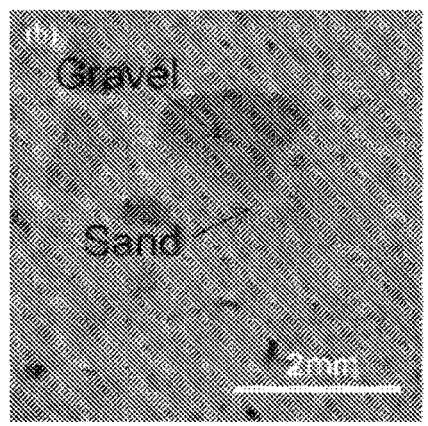
FIG. 14(b)
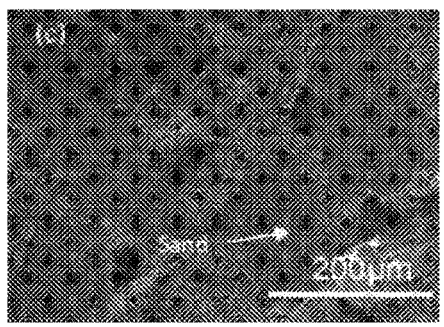
FIG. 14(c)

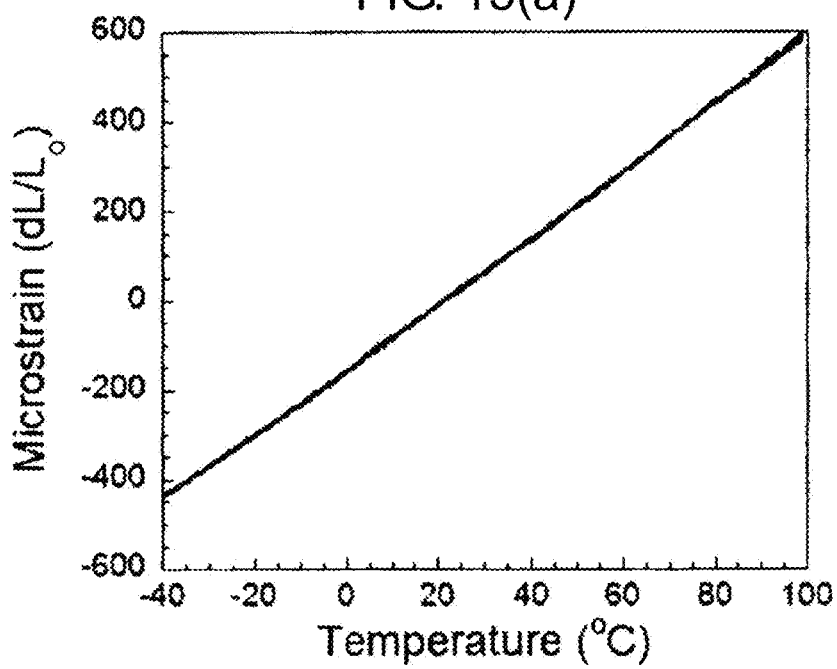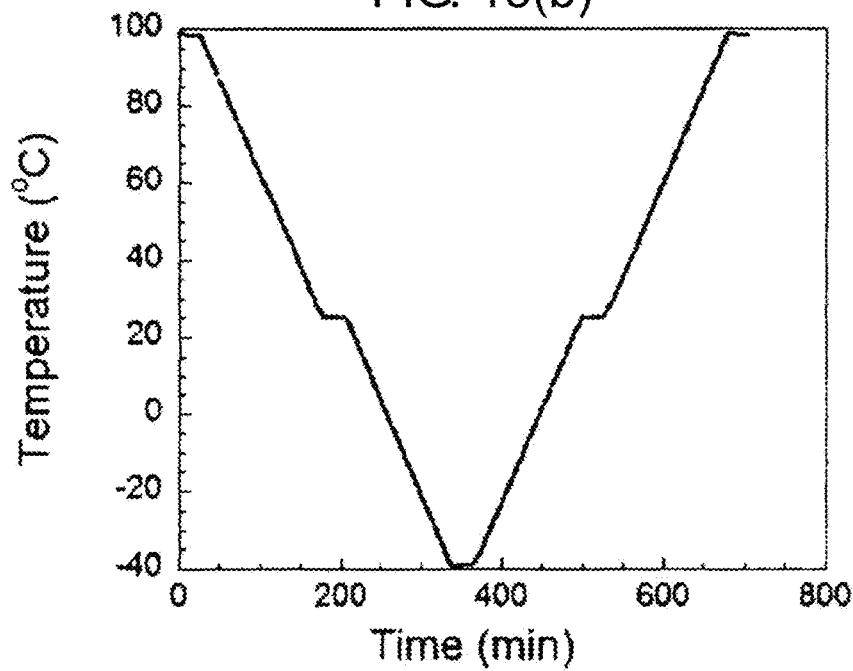

FIG. 17(a)
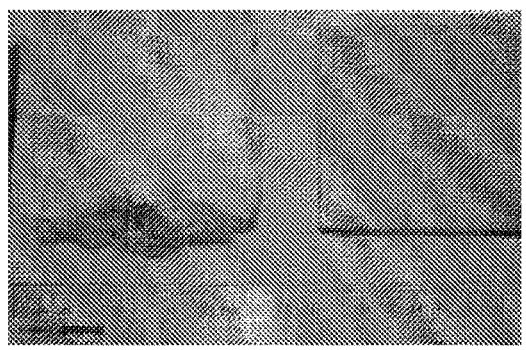
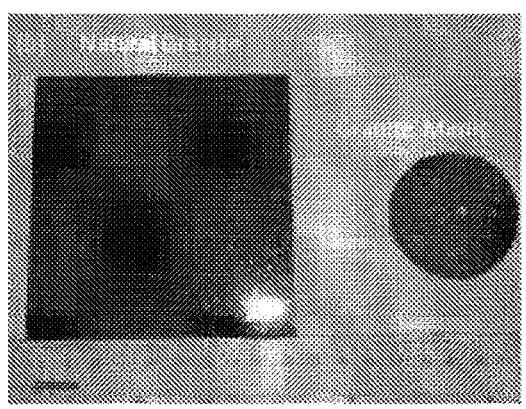
FIG. 17(b)
FIG. 17(c)

BONDING ELEMENT, BONDING MATRIX AND COMPOSITE MATERIAL HAVING THE BONDING ELEMENT, AND METHOD OF MANUFACTURING THEREOF

This application is a divisional of U.S. application Ser. No. 13/411,218, filed on Mar. 2, 2012, which application claims priority to U.S. Provisional Application Ser. No. 61/449,659, filed on Mar. 5, 2011, the entire contents of which are incorporated herein by reference.

FIELD OF INVENTION

The present invention generally relates to ceramic and/or composite materials. More specifically, the present invention relates to ceramic and/or composite materials that comprise bonding elements that improve mechanical and other properties associated with the ceramic and/or composite materials, as well as methods for making the bonding elements and the corresponding ceramic and/or composite materials.

BACKGROUND

Conventional ceramic materials, such as cement, concrete and other like materials can exhibit weak material properties. These weak material properties may be due to the fact that the bonds, for example hydrate bonds, in the material are often weak. Hydrate bonds are bonds that contain water in its molecular form. Hydrated Portland Cement is an example of a material that contains hydrate bonds such as $CaO.2SiO_2.4H_2O$ and $CaO.H_2O$. This weakness may cause the ceramic material to be fail prematurely, which is clearly an undesirable material characteristic.

Thus, a need exists to improve the bonds and, more generally, the bonding matrix associated with ceramic materials, such as cement, concrete and other like materials, so as to provide ceramic materials with improved material properties.

All references cited herein in this specification are incorporated by reference in their entirety.

SUMMARY OF THE INVENTION

In accordance with exemplary embodiments of the present invention, the bonding elements, bonding matrixes, composite materials, and methods of making said bonding elements result a wide range of attractive properties that may be optimized, including, but not limited to, mechanical properties, thermal properties, magnetic properties, optical properties and nuclear properties, as a result of the core/first layer/second layer structure of the bonding elements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1(a) fibrous, FIG. 1(b) elliptical, and FIG. 1(c) equiaxed.

(FIG. 3 adapted from: R. E. Newnham, D. P. Skinner and L. E. Cross, "Connectivity and piezoelectric-pyroelectric composites", Mat. Res. Bull. Vol. 13, pp. 525-536, 1978).

In FIG. 6(c) the regions of CaSiO, $SiO_2$, and $CaCO_3$ are referenced by arrows. Fiber shaped wollastonite ($CaSiO_3$) core particles are encapsulated by $SiO_2$ rich regions and surrounded by $CaCO_3$ particles.

FIG. 12(a) shows the 0-3 composite, where 70 vol. % sand (silica) particulate components are dispersed in P3 bonding matrix with porosities in the structure (also see Table 4). As shown in FIG. 12(b), this composite material showed a gradual failure during compression, and had a compressive strength of ≈55 MPa.

FIGS. 13(a)-13(b) illustrate a 1-level hierarchic system, and FIGS. 13(c)-13(d) illustrate a 2-level hierarchic system.

FIGS. 14(a)-(c) show different optical micrographs of a composite material according to an embodiment of the present invention. FIGS. 14(a) and 14(b) show optical micrographs of the composite material formed by using a volumetric ratio of 1:2:2 of FB1 Fiber Cores (Table 3), (300-500) μm sand, and (2-4) mm sand gravel respectively, and FIG. 14 (c) shows the bonding matrix in the void spaces of sand particles, and a thick layer of bonding matrix has surrounded sand particles to act as a cementing phase also.

FIGS. 15(a)-15(b) shows in FIG. 15(a) microstrain versus temperature, and FIG. 15(b) temperature versus time profile of FB1B during thermal cycling between −40° C. and 100° C.

FIGS. 17(a)-17(c) show digital photographs of, FIG. 17(a) conventional natural sandstone and a sandstone mimic according to an embodiment of the present invention, FIG. 17(b) conventional granite and a granite mimic according to an embodiment of the present invention, and FIG. 17(c) conventional terracotta and a terracotta mimic according to an embodiment of the present invention.

DETAILED DESCRIPTION OF THE ILLUSTRATED EMBODIMENTS

Reference will now be made in detail to an embodiment of the present invention, example of which is illustrated in the accompanying drawings.

Bonding Element

Figure 1A:
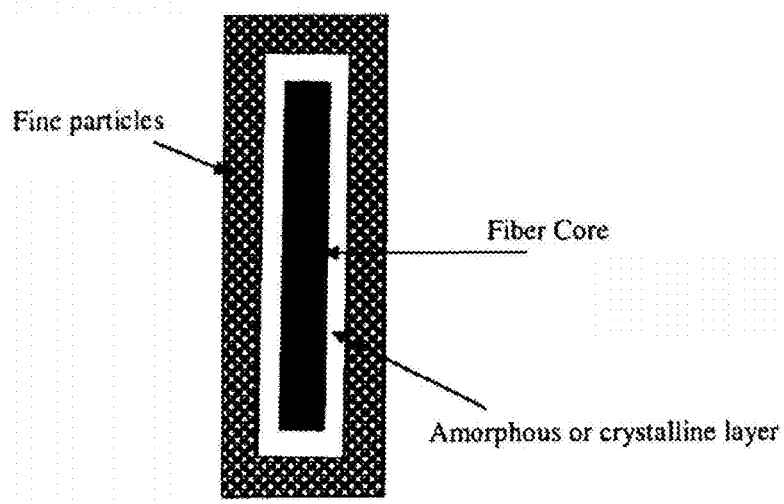
FIGS. 1(a)-1(c) are schematic cross-sections of single bonding elements according to exemplary embodiments of the present invention, illustrating three exemplary core morphologies.
Figure 1B:
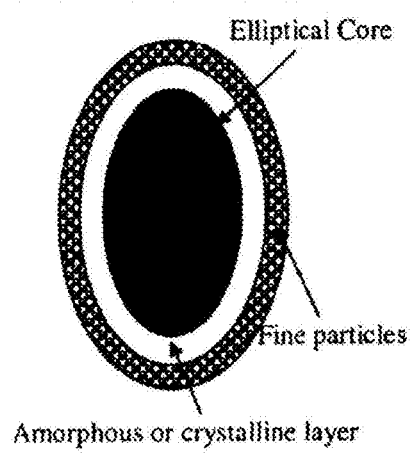
Figure 1C:
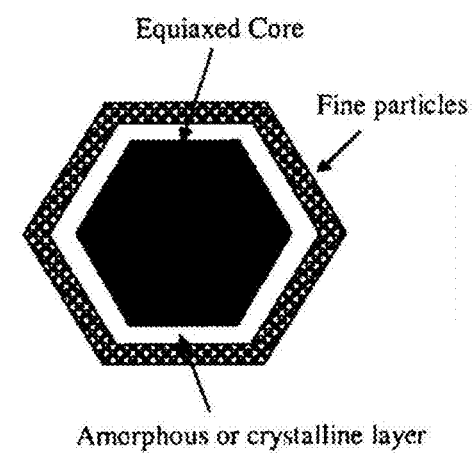

FIGS. 1(a)-1(c) illustrate the cross-section of exemplary bonding elements that may make up at least a portion of a larger ceramic or composite material. As shown in FIGS. 1(a)-1(c), a given bonding element includes a core, represented by the black inner portion; a first layer, represented by the white middle portion; and a second or encapsulating layer, represented by the outer portion.

In accordance with exemplary embodiments of the present invention, a bonding element may exhibit any size and morphology (i.e., shape) depending on the intended application. Table 1 provides a non-exclusive list of possible morphologies. The first layer may include only one layer or multiple sub-layers depending on the chemistry of the bonding element and may completely cover the core or partially cover the core. The first layer may exist in a crystalline phase, an amorphous phase or a combination thereof. The second layer may include only one layer or multiple sub-layers and may also completely or partially cover the first layer. The second layer may also comprise a plurality of particles or may be of a continuous phase, with minimal observable discrete particles.

| Hollow Structures: Geometrical Solids with a Cavity in the Center | |
|---|---|
| Name | Description |
| Ring | toroidal shape |
| Tube | long hollow object (usually cylindrical) |

| Other Qualitative Powder Morphology Descriptors (mostly for Irregular Solids) | |
|---|---|
| Name | Description |
| Acicular | needle-shaped |
| | slender, needle-shape for a particle of similar breadth and thickness, which are much smaller than length (L:B:T = (10-100):~1:~1); Length (L), Breadth (B) and Thickness (T) |
| Angular | sharp-edged or having roughly polyhedral shape |
| | particle shape showing sharp edges or having approximately polyhedral shape |
| | Sharp edges, prominent, slightly rounded or straight or piecewise crooked but not wiggly |
| Bent | Overall form is curved |
| Channels | Relatively rounded grooves |
| Concave | Dish like or prominent pit or hollow |
| Crescent | Noodle, or at least quarter noon |
| Columnar | long, thin particle shape showing a breadth and thickness that are greater than those of an acicular particle (L:B:T = (3-10):~1:~1) |
| Dendritic | Having a branched crystalline shape |
| | particle shape showing a typical pine tree structure (highly branched) |
| Equant | Length and width of outline roughly equal |
| Euhedral | All or nearly all faces are flat |
| Fiber, Fibrous | Regular or irregularly thread-like |
| | threadlike particle, which has a very large length/diameter ratio (longer and thinner than acicular particles) (L:B:T = (>100):~1:~1) (typical diameter about 0.1-10 mm) |
| Flake, Flaky | Plate-like |
| | thin, flat particle of similar length and breadth (L:B:T = ~1:~1:(<0.1)) (often with some curvature of surface, which will increase thickness) |
| | Very flat, sheet like, nearly 2 dimensional |
| Flattened | Oblate, thicker than flake, not bent |
| Fractal | Particle that shows self similarity at different size scales |
| Glass like | Smooth angular, or chonchoidal features |
| Grape like | Uniform and closely rounded bumps |
| Granular | Having approximately an equidimensional irregular shape |
| | particle shape that is irregular but has about equal dimensions larger than about 1 mm (L:B:T = ~1:~1:(0.5-2)) |
| Irregular | Lacking any symmetry |
| | Particle of about equal dimensions lacking any symmetry |
| Layers | Any evidence of parallel sheets, layers, cleavage |
| Long-thin | Length greater than width |
| Lumpy | Prominent protruding rounded bumps |
| Lath | long, thin and blade-like particle (L:B:T = (10-50):(2-5):1) |
| Modular | Having rounded, irregular shape |
| Needle | See acicular |
| Oblong | Length of outline greater than width |
| Plate | Flat particle of similar length and breadth but with greater thickness than flake (L:B:T = ~1:~1:(0.1-0.6)), but without surface curvature |
| Potato | Rounded, oblong, sub-smooth with dirt like decoration |
| Ribbon | Long, thin, and relatively flat |
| Ripples | Small or shallow roughly parallel waves of folds, unlike striations, which are more like scratches |
| Rod | Particle with a circular cross section, the diameter of which is smaller than length (L:DA = (2-5):1) |
| Rounded | Particle of any shape, usually having similar length, breadth and thickness, with rounded edges |
| | At least one surface is rounded, or most of the overall form looks rounded |
| Shard | Flattened, smooth broken edges |
| Smoothed | Looks smooth as if by melting or by a covering of glue |
| Eraser | Shape of a eraser |
| Burrito | Shape of a burrito |
| Africa | Shape of Africa |
| Jelly Fish | Shape of a Jell Fish |
| Worm | Shape of a worm |
| Subhedral | At least two prominent flat faces |
| Striated | Closely parallel scratches |
| Subangular | Rounded straight edges |
| Subsphere | Out of round but roughly spherical |
| Twisted | Appear wrung or twisted by end |

A bonding element is produced through a transformation process. This process will be described in greater detail below. In general, however, the process involves the transformation of reactive precursor particles. The precursor particles may have any desired size and shape and may be similar in size and shape, or they may vary. The transformation of a given precursor particle will result in a corresponding bonding element having a similar size and shape. The transformation process proceeds by exposing the precursor particles to a reactive liquid. A reactant associated with the liquid then reacts with the chemical elements that make up the precursor particles, and more specifically, the chemical elements in the peripheral portion of the precursor particles. This reaction eventually results in the formation of the aforementioned first and second layers.

In a first embodiment of the above-described bonding element, the precursor particles comprise two or more chemical elements, such as a ceramic material comprising multiple cations or a metallic material comprising multiple metals. During the transformation process, the reactant in the liquid preferentially reacts with at least a first one of the chemical elements, wherein the reaction between the reactant and the at least one first chemical element results in the formation of the first and second layers, the first layer comprising a derivative of the precursor particle, generally excluding the at least one first chemical element, whereas the second layer comprises a combination of the reactant and the at least one first chemical element. In comparison, the core comprises the same or nearly the same chemical composition as the precursor particle. For example, peripheral portions of the core may vary from the chemical composition of the precursor particle due to selective leaching of particular chemical elements from the core.

Thus, the core and the second layer share the at least one first chemical element of the precursor particle, and the core and the first layer share at least another one of the chemical elements of the precursor particle. The at least one first chemical element shared by the core and the second layer may be, for example, at least one alkaline earth element (beryllium, magnesium, calcium, strontium, barium and radium). The at least another one of the chemical elements shared by the core and the first layer may be, for example, silicon, titanium, aluminum, phosphorus, vanadium, tungsten, molybdenum, gallium, manganese, zirconium, germanium, copper, niobium, cobalt, lead, iron, indium, arsenic and/or tantalum.

In a second exemplary embodiment, the precursor particles can still comprise two or more chemical elements; however, during the transformation process, the reactant in the liquid preferentially reacts with at least a first one of the chemical elements, wherein the reaction between the reactant and the at least one first chemical element results in the formation of the first and second layers, the first layer and second layer both comprising a combination of the reactant and the at least one first chemical element. Thus, the cations associated with the chemical composition of the first layer correspond to a first one of the two or more chemical elements of the precursor particles, and the cations associated with the second layer also correspond to the first one of the two or more chemical elements of the precursor particles.

In yet an alternative exemplary embodiment, the reaction between the reactant and the at least one first chemical element of the precursor particles may be carried out to completion thus resulting in the first layer becoming the core of the bonding element and having a chemical composition that is different from that of the precursor particles, and at least one additional or second shell layer comprising a composition that may or may not include the at least one first chemical element of the two or more chemical elements of the precursor particles.

The precursor particles can be selected from any suitable material that can undergo the above-describe transformation. For example, the precursor particles may include oxides and non-oxides of silicon, titanium, aluminum, phosphorus, vanadium, tungsten, molybdenum, gallium, manganese, zirconium, germanium, copper, niobium, cobalt, lead, iron, indium, arsenic, tantalum, and/or alkaline earth elements (beryllium, magnesium, calcium, strontium, barium and radium). For example, the precursor particle may include oxides such as silicates, titanates, aluminates, phosphates, vanadates, tungstates, molybdates, gallates, manganates, zirconates, germinates, cuprates, stannates, hafnates, chromates, niobates, cobaltates, plumbates, ferrites, indates, arsenates, tantalates and combinations thereof. In a preferred embodiment, the precursor particles include silicates such as orthosilicates, sorosilicates, cyclosilicates, inosilicates, phyllosilicates, tectosilicates and/or calcium silicate hydrate. It is believed that the various specific silicates listed in Table 2A may be used as the precursor particle. It is also believed that various specific non-silicates listed in Table 2A may be used as the precursor particle and that the various rock containing materials as listed in Table 2A can be used as the precursor particle.

TABLE 2A

List of reactive precursors
1. Silicates

| | | |
|---|---|---|
| Nesosilicates or orthosilicates | Nesosilicates (from Greek νησος nēsos, island), or orthosilicates, have isolated (insular) $[SiO_4]^{4-}$ tetrahedra that are connected only by interstitial cations. | Phenacite group<br>    Phenacite - $Be_2SiO_4$<br>    Willemite - $Zn_2SiO_4$<br>Olivine group<br>    Forsterite - $Mg_2SiO_4$<br>    Fayalite - $Fe_2SiO_4$<br>Garnet group<br>    Pyrope - $Mg_3Al_2(SiO_4)_3$<br>    Almandine - $Fe_3Al_2(SiO_4)_3$<br>    Spessartine - $Mn_3Al_2(SiO_4)_3$<br>    Grossular - $Ca_3Al_2(SiO_4)_3$<br>    Andradite - $Ca_3Fe_2(SiO_4)_3$<br>    Uvarovite - $Ca_3Cr_2(SiO_4)_3$<br>    Hydrogrossular - $Ca_3Al_2Si_2O_8(SiO_4)_{3-m}(OH)_{4m}$<br>Zircon group<br>    Zircon - $ZrSiO_4$<br>    Thorite - $(Th, U)SiO_4$ |
| Kyanite crystals | | $Al_2SiO_5$ group<br>    Andalusite - $Al_2SiO_5$<br>    Kyanite - $Al_2SiO_5$<br>    Sillimanite - $Al_2SiO_5$<br>    Dumortierite - $Al_{6.5-7}BO_3(SiO_4)_3(O, OH)_3$<br>    Topaz - $Al_2SiO_4(F, OH)_2$<br>    Staurolite - $Fe_2Al_9(SiO_4)_4(O, OH)_2$<br>Humite group - $(Mg, Fe)_7(SiO_4)_3(F, OH)_2$<br>    Norbergite - $Mg_3(SiO_4)(F, OH)_2$<br>    Chondrodite - $Mg_5(SiO_4)(F, OH)_2$<br>    Humite - $Mg_7(SiO_4)(F, OH)_2$<br>    Clinohumite - $Mg_9(SiO_4)(F, OH)_2$<br>Datolite - $CaBSiO_4(OH)$<br>Titanite - $CaTiSiO_5$<br>Chloritoid - $(Fe, Mg, Mn)_2Al_4Si_2O_{10}(OH)$ |

TABLE 2A-continued

List of reactive precursors
1. Silicates

| | | |
|---|---|---|
| Sorosilicates | Sorosilicates have isolated double tetrahedra groups with $(Si_2O_7)^{6-}$ or a ratio of 2:7. | Hemimorphite (calamine) - $Zn_4(Si_2O_7)(OH)_2 \cdot H_2O$<br>Lawsonite - $CaAl_2(Si_2O_7)(OH)_2 \cdot H_2O$<br>Ilvaite - $CaFe^{2+}{}_2Fe^{3+}O(Si_2O_7)(OH)$<br>Epidote group (has both $(SiO_4)^{4-}$ and $(Si_2O_7)^{6-}$ groups)<br>    Epidote - $Ca_2(Al, Fe)_3O(SiO_4)(Si_2O_7)(OH)$<br>    Zoisite - $Ca_2Al_3O(SiO_4)(Si_2O_7)(OH)$<br>    Clinozoisite - $Ca_2Al_3O(SiO_4)(Si_2O_7)(OH)$<br>    Tanzanite - $Ca_2Al_3O(SiO_4)(Si_2O_7)(OH)$<br>    Allanite - $Ca(Ce, La, Y, Ca)Al_2(Fe^{2+}, Fe^{3+})O(SiO_4)(Si_2O_7)(OH)$<br>    Dollaseite-(Ce)—$CaCeMg_2AlSi_3O_{11}F(OH)$<br>Vesuvianite (idocrase) - $Ca_{10}(Mg, Fe)_2Al_4(SiO_4)_5(Si_2O_7)_2(OH)_4$ |
| Cyclosilicates | Cyclosilicates, or ring silicates, have linked tetrahedra with $(Si_xO_{3x})^{2x-}$ or a ratio of 1:3. These exist as 3-member $(Si_3O_9)^{6-}$, 4-member $(Si_4O_{12})^{8-}$ and 6-member $(Si_6O_{18})^{12-}$ rings. | 3-member ring<br>    Benitoite - $BaTi(Si_3O_9)$<br>4-member ring<br>    Axinite - $(Ca, Fe, Mn)_3Al_2(BO_3)(Si_4O_{12})(OH)$<br>6-member ring<br>    Beryl/Emerald - $Be_3Al_2(Si_6O_{18})$<br>    Cordierite - $(Mg, Fe)_2Al_3(Si_5AlO_{18})$<br>    Tourmaline - $(Na, Ca)(Al, Li, Mg)_{3-}(Al, Fe, Mn)_6(Si_6O_{18})(BO_3)_3(OH)_4$ |
| Inosilicates | Inosilicates (from Greek ἴς [genitive: ἰνός inos], fibre), or chain silicates, have interlocking chains of silicate tetrahedra with either $SiO_3$, 1:3 ratio, for single chains or $Si_4O_{11}$, 4:11 ratio, for double chains. | |
| Single chain inosilicates | | Pyroxene group<br>    Enstatite - orthoferrosilite series<br>        Enstatite - $MgSiO_3$<br>        Ferrosilite - $FeSiO_3$<br>    Pigeonite - $Ca_{0.25}(Mg, Fe)_{1.75}Si_2O_6$<br>    Diopside - hedenbergite series<br>        Diopside - $CaMgSi_2O_6$<br>        Hedenbergite - $CaFeSi_2O_6$<br>        Augite - $(Ca, Na)(Mg, Fe, Al)(Si, Al)_2O_6$<br>    Sodium pyroxene series<br>        Jadeite - $NaAlSi_2O_6$<br>        Aegirine (Acmite) - $NaFe^{3+}Si_2O_6$<br>    Spodumene - $LiAlSi_2O_6$<br>Pyroxenoid group<br>    Wollastonite - $CaSiO_3$<br>    Rhodonite - $MnSiO_3$<br>    Pectolite - $NaCa_2(Si_3O_8)(OH)$ |
| Double chain inosilicates | | Amphibole group<br>    Anthophyllite - $(Mg, Fe)_7Si_8O_{22}(OH)_2$<br>    Cumingtonite series<br>        Cummingtonite - $Fe_2Mg_5Si_8O_{22}(OH)_2$<br>        Grunerite - $Fe_7Si_8O_{22}(OH)_2$<br>    Tremolite series<br>        Tremolite - $Ca_2Mg_5Si_8O_{22}(OH)_2$<br>        Actinolite - $Ca_2(Mg, Fe)_5Si_8O_{22}(OH)_2$<br>    Hornblende - $(Ca, Na)_{2-3}(Mg, Fe, Al)_5Si_6(Al, Si)_2O_{22}(OH)_2$<br>    Sodium amphibole group<br>        Glaucophane - $Na_2Mg_3Al_2Si_8O_{22}(OH)_2$<br>        Riebeckite ( ) - $Na_2Fe^{2+}{}_3Fe^{3+}{}_2Si_8O_{22}(OH)_2$<br>        Arfvedsonite - $Na_3(Fe, Mg)_4FeSi_8O_{22}(OH)_2$ |
| Phyllosilicates | Phyllosilicates (from Greek φύλλν phyllon, leaf), or sheet silicates, form parallel sheets of silicate tetrahedra with $Si_2O_5$ or a 2:5 ratio. | |
| Kaolin | | Serpentine group<br>    Antigorite - $Mg_3Si_2O_5(OH)_4$<br>    Chrysotile - $Mg_3Si_2O_5(OH)_4$<br>    Lizardite - $Mg_3Si_2O_5(OH)_4$<br>Clay mineral group<br>    Halloysite - $Al_2Si_2O_5(OH)_4$<br>    Kaolinite - $Al_2Si_2O_5(OH)_4$<br>    Illite - $(K, H_3O)(Al, Mg, Fe)_2(Si, Al)_4O_{10}[(OH)_2, (H_2O)]$<br>    Montmorillonite - $(Na, Ca)_{0.33}(Al, Mg)_2(Si_4O_{10})(OH)_2 \cdot nH_2O$<br>    Vermiculite - $(MgFe, Al)_3(Al, Si)_4O_{10}(OH)_2 \cdot 4H_2O$<br>    Talc - $Mg_3Si_4O_{10}(OH)_2$<br>    Palygorskite - $(Mg, Al)_2Si_4O_{10}(OH) \cdot 4(H_2O)$<br>    Pyrophyllite - $Al_2Si_4O_{10}(OH)_2$<br>Mica group<br>    Biotite - $K(Mg, Fe)_3(AlSi_3O_{10})(OH)_2$<br>    Muscovite - $KAl_2(AlSi_3O_{10})(OH)_2$<br>    Phlogopite - $KMg_3Si_4O_{10}(OH)_2$<br>    Lepidolite - $K(Li, Al)2_{-3}(AlSi_3O_{10})(OH)_2$<br>    Margarite - $CaAl_2(Al_2Si_2O_{10})(OH)_2$<br>    Glauconite - $(K, Na)(Al, Mg, Fe)_2(Si, Al)_4O_{10}(OH)_2$<br>Chlorite group<br>    Chlorite - $(Mg, Fe)_3(Si, Al)_4O_{10}(OH)_2 \cdot (Mg, Fe)_3(OH)_6$ |

TABLE 2A-continued

List of reactive precursors
1. Silicates

| | | |
|---|---|---|
| Tectosilicates | Tectosilicates, or "framework silicates," have a three-dimensional framework of silicate tetrahedra with $SiO_2$ or a 1:2 ratio. This group comprises nearly 75% of the crust of the Earth. Tectosilicates, with the exception of the quartz group, are aluminosilicates. | Feldspar group<br>  Alkali-feldspars<br>    Potassium-feldspars<br>      Microcline - $KAlSi_3O_8$<br>      Orthoclase - $KAlSi_3O_8$<br>      Sanidine - $KAlSi_3O_8$<br>    Anorthoclase - $(Na, K)AlSi_3O_8$<br>  Plagioclase feldspars<br>    Albite - $NaAlSi_3O_8$<br>    Oligoclase - $(Na, Ca)(Si, Al)_4O_8$ (Na:Ca 4:1)<br>    Andesine - $(Na, Ca)(Si, Al)_4O_8$ (Na:Ca 3:2)<br>    Labradorite - $(Na, Ca)(Si, Al)_4O_8$ (Na:Ca 2:3)<br>    Bytownite - $(Na, Ca)(Si, Al)_4O_8$ (Na:Ca 1:4)<br>    Anorthite - $CaAl_2Si_2O_8$<br>Feldspathoid group<br>  Nosean - $Na_8Al_6Si_6O_{24}(SO_4)$<br>  Cancrinite - $Na_6Ca_2(CO_3, Al_6Si_6O_{24}) \cdot 2H_2O$<br>  Leucite - $KAlSi_2O_6$<br>  Nepheline - $(Na, K)AlSiO_4$<br>  Sodalite - $Na_8(AlSiO_4)_6Cl_2$<br>    Hauyne - $(Na, Ca)_{4-8}Al_6Si_6(O, S)24(SO_4, Cl)_{1-2}$<br>    Lazurite - $(Na, Ca)_8(AlSiO_4)_6(SO_4, S, Cl)_2$<br>Petalite - $LiAlSi_4O_{10}$<br>Scapolite group<br>  Marialite - $Na_4(AlSi_3O_8)_3(Cl_2, CO_3, SO_4)$<br>  Meionite - $Ca_4(Al_2Si_2O_8)_3(Cl_2CO_3, SO_4)$<br>Analcime - $NaAlSi_2O_6 \cdot H_2O$<br>Zeolite group<br>  Natrolite - $Na_2Al_2Si_3O_{10} \cdot 2H_2O$<br>    Chabazite - $CaAl_2Si_4O_{12} \cdot 6H_2O$<br>    Heulandite - $CaAl_2Si_7O_{18} \cdot 6H_2O$<br>    Stilbite - $NaCa_2Al_5Si_{13}O_{36} \cdot 17H_2O$<br>Calcium silicate hydrate: this is the main reaction product and is the main source of concrete strength. It is often abbreviated, using cement chemists' notation, to "C—S—H," the dashes indicating that no strict ratio of $SiO_2$ to CaO is inferred. The Si/Ca ratio is somewhat variable but typically approximately 0.45-0.50. |

It is also believed that some waste materials may be used as the precursor particles. Waste materials may include, for example, minerals, industrial waste, or an industrial chemical material. Some exemplary waste materials include mineral silicate, iron ore, periclase, gypsum, iron (II) huydroxide, fly ash, bottom ash, slag, glass, oil shells, red mud, battery waste, recycled concrete, mine tailings, paper ash, or salts from concentrated reverse osmosis brine.

Additional precursor particles may include different types of rock containing minerals such as cal-silicate rock, fitch formation, hebron gneiss, layered gneiss, middle member, argillite, quartzite, intermediate Precambrian sediments, dark-colored, feldpathic quartzite with minor limestone beds, high-grade metasedimentry biotite schist, biotite gniss, mica schist, quartzite, hoosac formation, partridge formation, Washington gneiss, Devonian, Silurian greenvale cove formation, ocoee supergroup, metasandstone, metagraywacke, Rangeley formation, amphibolites, calcitic and dolomite marble, manhattan formation, rusty and gray biotite-quartz-feldspar gneiss, and waterford group.

Precursor particles may also include igneous rocks such as, but not limited to, andesite, anorthosite, basinite, boninite, carbonatite and charnockite, sedimentary materials such as, but not limited to, argillite, arkose, breccias, cataclasite, chalk, claystone, chert, flint, gitsone, lighine, limestone, mudstone, sandstone, shale, and siltsone, metamorphic materials such as, but not limited to, amphibolites, epidiorite, gneiss, granulite, greenstone, hornfels, marble, pelite, phyllite, quartzite, shist, skarn, slate, talc carbonate, and soapstone, and other varieties of rocks such as, but not limited to, adamellite, appinite, aphanites, borolanite, blue granite, epidosite, felsites, flint, ganister, ijolite, jadeitite, jasproid, kenyte, vogesite, larvikite, litchfieldite, luxullianite, mangerite, minette, novaculite, pyrolite, rapakivi granite, rhomb porphyry, shonkinite, taconite, teschenite, theralite, and variolite.

Likewise, the first layer may comprise any chemical composition that may be derived from the chemical compositions of the various precursor materials described above.

As explained previously, the second, encapsulating layer, may comprise a combination of the reactant and the at least one chemical element from the precursor particle. In accordance with exemplary embodiments of the present invention, the second or encapsulating layer can comprise a number of possible chemistries. For examples, the encapsulating layer may comprise a carbonate having a naturally occurring structure. The second or encapsulating layer may also comprise other possible carbonate chemistries, as well as sulfates, phosphates and other anionic compounds capable of dissolving in a solvent and reacting with a precursor particle.

Table 2B provides exemplary embodiments of different types of chemistries for the first and second layers that can be achieved when using different precursor materials. The examples listed in Table 2B should not be viewed as limiting or as an exhaustive list of possible materials but only as exemplary as many different additional types of chemistries may be achieved depending on the precursor material. Regarding the first layer, by using different precursor materials one may obtain silica, alumina or titania. The second layer may also be modified with the selection of the precursor material. For example, the non-exhaustive list of materials for the second layer exemplified in Table 2B may include various types of carbonates such as, but not limited to, pure carbonates, multiple cations carbonates, carbonates with water or an OH group, layered carbonates with either water or an OH group, anion containing carbonates, silicate containing carbonates, and carbonate-bearing minerals.

The reactant of the reactive liquid, here carbon dioxide, preferentially reacts with the Ca cations of the wollastonite precursor core, thereby transforming the peripheral portion of the precursor core into a silica-rich first layer and a calcium carbonate-rich second layer. Also, the presence of the first and second layers on the core act as a barrier to further reaction between wollastonite and carbon dioxide,

TABLE 2B

Concept showing how different raw materials (precursors) can be used to generate different types of encapsulating layers

| Raw Material (Precursor) from Table 2A | First Layer | Encapsulating Layer | Type of Carbonate |
|---|---|---|---|
| Wollastonite ($CaSiO_3$) | Silica-rich | $CaCO_3$ | Pure carbonate |
| Fosterite ($Mg_2SiO_4$) | | $MgCO_3$ | |
| Diopside ($CaMgSi_2O_6$) | | $(Ca, Mg)CO_3$ | Multiple Cation carbonates |
| Talc ($Mg_3Si_4O_{10}(OH)_2$) | | $MgCO_3 \cdot xH_2O$ (x = 1-5) | Pure carbonate with $H_2O$ |
| Glaucophane ($Na_2Mg_3Al_2Si_8O_{22}(OH)_2$) | Alumina and/or | $MgCO_3$ and/or $NaAlCO_3(OH)_2$ | Pure carbonate with OH group |
| Palygorskite (($Mg, Al)_2Si_4O_{10}(OH) \cdot 4(H_2O)$) | Silica-rich | $Mg_6Al_2CO_3(OH)_{16}4H_2O$ | Layered carbonates with OH and $H_2O$ group |
| Meionite ($Ca_4(Al_2Si_2O_8)_3(Cl_2CO_3, SO_4)$) | | $Ca_2SO_4CO_3 \cdot 4H_2O$ | Anion- containing carbonates |
| Tanzanite ($Ca_2Al_3O(SiO_4)(Si_2O_7)(OH)$) | | $Ca_5Si_2O_8CO_3$ and/or $Ca_5Si_2O_8CO_3$ and/or $Ca_7Si_6O_{18}CO_3 \cdot 2H_2O$ | Silicate-containing carbonates |
| ($Ba_{0.6}Sr_{0.3}Ca_{0.1})TiO_3$ | Titania-rich | $Sr(Sr, Ca, Ba)(CO3)2$ | Post-1992 Carbonate-Bearing Minerals |

To further provide additional guidance on how to achieve the above exemplary embodiments listed in Table 2B, the following is a more detailed discussion on how to achieve some of these exemplary materials.

Referring again to FIGS. 1(a)-1(c), three different, exemplary morphologies for the bonding elements are illustrated. The shape or morphology associated with the core and/or the bonding element may be the same or similar to the shape of the precursor particle. Thus, the precursor particle and, accordingly, the corresponding bonding element and/or core may take on any of a number of morphologies, including but not limited to a spherical shape, an elliptical shape, a polygonal shape, such as a hexagon, or any of a number of other shapes. Furthermore, the morphology of the precursor particle and, accordingly, the corresponding bonding element and/or core may be equiaxed or have one axis longer than another, as in the case of a wire or a rod shape. Still further, the precursor particle may comprise one crystal (i.e., "single crystalline") or a plurality of crystals (i.e., "polycrystalline"). The precursor particle may actually comprise a plurality of particles or include an amorphous phase.

In a first specific example, a precursor particle formed predominately of wollastonite, $CaSiO_3$, reacts with carbon dioxide dissolved in water. It is believed that calcium cations are leached from the wollastonite and thereby change the peripheral portion of the wollastonite core into calcium-deficient wollastonite. As the calcium cations continue to be leached from the peripheral portion of the core, the structure of the peripheral portion eventually become unstable and breaks down, thereby transforming the calcium-deficient wollastonite peripheral portion of the core into a predominantly silica-rich first layer. Meanwhile, it is believed that a predominantly calcium carbonate second layer precipitates from the water. More specifically, the first layer and second layer may be formed from the precursor particle according the following reaction:

$$H_2O + CaSiO_3 + CO_2 = CaCO_3 + SiO_2 + H_2O$$

thus resulting in the bonding element having the core, first layer and second layer.

In this and other examples of the first embodiment, both the anions and cations vary in the respective layers. In this example, the core has $Ca^{+2}$, $Si^{+4}$ and $O^{2-}$ ions, the second layer has mostly $Si^{+4}$ and $O^{2-}$ and a small amount of $Ca^{2+}$ ions, while the second layer has $Ca^{2+}$ and $CO_3^{2-}$ ions.

In a second example of the first embodiment, a precursor particle formed predominately of forsterite, $Mg_2SiO_4$, reacts with dissolved carbon dioxide transforming a peripheral portion of the forsterite into a predominantly silica first layer and a predominantly magnesium carbonate second layer. More specifically, the first layer and second layer may be formed from the precursor particle according the following reaction:

$$H_2O + Mg_xSi_yO_z + CO_2 = xMgCO_3 + ySiO_2 + H_2O$$

The reactant of the reactive liquid, here carbon dioxide, preferentially reacts with the Mg cations of the forsterite precursor core, thereby transforming the peripheral portion of the precursor particle into a silica-rich first layer and a magnesium carbonate rich second layer. Also, the presence of the first and second layers on the core act as a barrier to further reaction between forsterite and carbon dioxide, thus resulting in the bonding element having the core, first layer and second layer.

In a third example of the first embodiment, a precursor particle formed predominately of talc, $Mg_3Si_4O_{10}(OH)_2$, is preheated at 900° C. for 12 hours, to form dehydrated talc, reacts with dissolved carbon dioxide transforming a peripheral portion of the talc into a predominantly silica first layer and second layer formed predominantly of $MgCO_3 \cdot xH_2O$ (x=1-5) More specifically, the first layer and second layer may be formed from the precursor particle according the following reaction:

$$H_2O + Mg_3Si_4O_{10}(OH)_2 + CO_2 = MgCO_3 \cdot xH_2O(x=1-5) + SiO_2 + H_2O$$

The reactant of the reactive liquid, here carbon dioxide, preferentially reacts with the Mg cations of the talc, thereby transforming the peripheral portion of the precursor particle into a silica-rich first layer and a second layer rich with $MgCO_3 \cdot xH_2O$ (x=1-5). Also, the presence of the first and second layers on the core act as a barrier to further reaction between talc and carbon dioxide, thus resulting in the bonding element having the core, first layer and second layer.

In a fourth example of the first embodiment, a precursor particle formed predominately of diopside, $MgCaSi_2O_6$, reacts with dissolved carbon dioxide transforming a peripheral portion of the diopside into a predominantly silica first layer and second layer formed predominantly of a mixture of calcium carbonate, $CaCO_3$, and magnesium carbonate, $MgCO_3$ and/or dolomite $(Mg,Ca)CO_3$ with variable ration of Mg and Ca. The second layer may include, for example, a first sub-layer of magnesium carbonate and a second sub-layer of calcium carbonate. Alternatively, the second layer may include a plurality of carbonated particles, such as $CaCO_3$ $(Mg,Ca)CO_3$ and $MgCO_3$.

The first layer and second layer may be formed from the precursor particle according to one or a combination of both the following reactions:

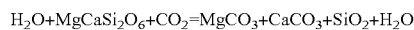

$$H_2O + MgCaSi_2O_6 + CO_2 = MgCO_3 + CaCO_3 + SiO_2 + H_2O$$

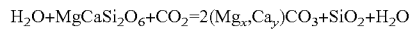

$$H_2O + MgCaSi_2O_6 + CO_2 = 2(Mg_x,Ca_y)CO_3 + SiO_2 + H_2O$$

The reactant of the reactive liquid, here carbon dioxide, preferentially reacts with the Ca and Mg cations of the diopside, thereby transforming the peripheral portion of the precursor particle into a silica-rich first layer and a second layer rich with a mixture of calcium carbonate and magnesium carbonate and/or dolomite with variable ratio of Mg and Ca. Also, the presence of the first and second layers on the core act as a barrier to further reaction between diopside and carbon dioxide, thus resulting in the bonding element having the core, first layer and second layer.

In a fifth example of the first embodiment, the precursor particle/core is be formed of glaucophane, $Na_2Mg_3Al_2Si_8O_{22}(OH)_2$, the first layer is alumina- and/or silica-rich, and the second layer is $MgCO_3$ and/or $NaAlCO_3(OH)_2$.

In a sixth example of the first embodiment, the precursor particle/core is formed of palygorskite, $(Mg,Al)_2Si_4O_{10}(OH) \cdot 4(H_2O)$, the first layer is alumina- and/or silica-rich, and the second layer is $Mg_6Al_2CO_3(OH)_{16} \cdot 4H_2O$.

In a seventh example of the first embodiment, the precursor particle/core is formed of meionite, $Ca_4(Al_2Si_2O_8)_3(Cl_2CO_3,SO_4)$, the first layer is alumina- and/or silica-rich, and the second layer is $Ca_2SO_4CO_3 \cdot 4H_2O$.

In an eighth example of the first embodiment, the precursor particle/core is formed of tanzanite, $Ca_2Al_3O(SiO_4)(Si_2O_7)(OH)$, the first layer is alumina- and/or silica-rich, and the second layer is $Ca_5Si_2O_8CO_3$, $Ca_5Si_2O_8CO_3$ and/or $Ca_7Si_6O_{18}CO_3 \cdot 2H_2O$.

In a ninth example of the first embodiment, the precursor particle/core is formed of $(Ba_{0.6}Sr_{0.3}Ca_{0.1})TiO_3$, the first layer is titania-rich, and the second layer is olekminskite $Sr(Sr,Ca,Ba)(CO_3)_2$.

As demonstrated in Table 2C, the second layer may also be modified by introducing additional anions and/or cations to the already $CO_3^{-2}$ anions present. Accordingly, the second layer may comprise a chemical composition including cations bonded with anions corresponding to one or more reactants. The cations associated with the chemical composition of the second layer may be bonded to the anions of a first reactant. The cations associated with the chemical composition of the second layer may be bonded to the anions of a reactant other than the first reactant. The cations associated with the chemical composition of the second layer may alternatively be bonded to the anions of a first reactant and to the anions of a second or more reactants. Such additional anions and cations may be used to modify the second layer to increase its physical and chemical properties such as fire resistance or acid resistance. For example, as shown in Table 2C, while the first layer is retained as a silica-rich layer, the second layer may be modified by adding extra anions or cations to the reaction. Some exemplary anions that may be added include $PO_4^{-2}$ and $SO_4^{-2}$. Other anions or cations may also be used. As demonstrated in Table 2C, the end results may include, for example, different phosphate, sulphate, fluoride bearing carbonates or combinations thereof. As in Table 2B, the examples provided in Table 2C are only exemplary and should not be viewed as limiting as they are not an exhaustive list of possibilities.

TABLE 2C

Concept showing how by using wollastonite as a core particle, how different source of anions and/or cations, in addition to $CO_3^{-2}$ anions, can be used to generate modified encapsulating layers

| Core Particle | First Layer | Extra anion/cation source | Encapsulating Layer | Carbonate Type |
|---|---|---|---|---|
| $CaSiO_3$ | Silica rich layer | Phosphates | $Ca_5(PO_4,CO_3)_3OH$ | Phosphate bearing carbonates |
| | | Sulphates | $Ca_2SO_4CO_3 \cdot 4H_2O$ | Sulphate bearing carbonates |
| | | Fluorides | $Ca_2CO_3F_2$ | Fluorides bearing carbonates |
| | | Phophates and fluorides | $Ca_5(PO_4,CO_3)_3F$ | Fluoride and phosphates bearing carbonates |
| | | $Mg^{+2}$ source like chlorides, nitrates, hydroxides etc. | $CaMg(CO_3)_2$ | Multiple cation carbonates |
| | | A combination of cation and anion sources | $Ca_6Mg_2(SO_4)_2(CO_3)_2Cl_4(OH)_4 \cdot 7H_2O$ | Post-1992 Carbonate-Bearing Minerals |

In a further exemplary embodiment, a precursor particle may be formed predominately of copper and may be reacted with water transforming a peripheral portion of the precursor particle into a first layer formed predominantly of copper hydroxide. Next, carbon dioxide may be used to transform a peripheral portion of the first layer into a predominantly copper carbonate second layer. The presence of the second layer on the first layer acts as a barrier to further reaction between carbon dioxide and the copper, thus resulting in the bonding element having the core, first layer and second layer. In this example, elemental copper is in the core, and the combination $Cu^{2+}$ and $OH^-$ to form copper hydroxide constitute the first layer, and the combination of $Cu^{2+}$ and $CO_3^{2-}$ to form copper carbonate constitute the second layer.

A similar result may also be achieved in a modified exemplary embodiment in which the precursor particle may be formed predominately of copper oxide. The precursor particle is then reacted with water transforming a peripheral portion of the precursor particle into a first layer formed predominantly of copper hydroxide. Next, carbon dioxide may be used to transform a peripheral portion of the first layer into a predominantly copper carbonate second layer. The presence of the second layer on the first layer acts as a barrier to further reaction between carbon dioxide and the copper, thus resulting in the bonding element having the core, first layer and second layer. In this modified example, copper is also present in the core, the combination of $Cu^{2+}$ and $OH^-$ into copper hydroxide constitute the first layer, and the combination of $Cu^{2+}$ and $CO_3^{2-}$ into copper carbonate constitute the second layer. Thus, in these exemplary embodiments, the core and the first and second layers all have the same cationic species but different anions.

In a further exemplary embodiment, a precursor particle formed predominantly of bronze reacts with water transforming a peripheral portion of the precursor particle into a first layer including copper hydroxide. Next, carbon dioxide transforms a peripheral portion of the first layer into second layer including copper carbonate. The presence of the second layer on the first layer acts as a barrier to further reaction between carbon dioxide and the bronze, thus resulting in the bonding element having the core, first layer and second layer.

In yet a further exemplary embodiment, a precursor particle may also be formed of a material other than copper or bronze. The precursor material may be one selected from the previously discussed list. For example, the precursor material may comprise silicon. The precursor may alternatively comprise aluminum. The precursor material may otherwise comprise iron. The precursor could than react to form a hydroxide as the first layer. Thus, for example, the first layer may be formed of a silicon hydroxide. Alternatively, the first layer may comprise an aluminum hydroxide. The first layer might instead comprise an iron hydroxide. Furthermore, instead of a hydroxide, the first layer may comprise an oxide. For example, the first layer may comprise a silicon oxide. In the alternative, the first layer may comprise aluminum oxide. In yet another alternative, the first layer may comprise an iron oxide. Similarly, the second layer may constitute a carbonate as discussed above. Thus, for example, the second layer may comprise silicon carbonate. In the alternative, the second layer may comprise aluminum carbonate. In yet another embodiment, the second layer may comprise iron carbonate. As discussed above, other precursors materials may be used, thus these compositions of core, first layer, and second layer are simply exemplary and should not be viewed as limiting.

Process of Forming the Bonding Elements

The above-described bonding elements may be formed, for example, by a method of gas-assisted hydrothermal liquid phase sintering. In this method, a porous solid body including a plurality of precursor particles is exposed to a solvent, which partially saturates the pores of the porous solid body, meaning that the volume of the pores are partially filled with water.

In some systems such as carbonate forming ones, completely filling the pores with water is believed to be undesirable because the reactive gas is unable to diffuse from the outer surface of the porous solid body to all of the internal pores by gaseous diffusion. Instead, the reactant of the reactive gas would dissolve in the liquid and diffuse in the liquid phase from the outer surface to the internal pores, which is much slower. This liquid-phase diffusion may be suitable for transforming thin porous solid bodies but would be unsuitable for thicker porous solid bodies.

A gas containing a reactant is introduced into the partially saturated pores of the porous solid body and the reactant is dissolved by the solvent. The dissolved reactant then reacts with the at least first chemical element in the precursor particle to transform the peripheral portion of the precursor particle into the first layer and the second layer. As a result of the reaction, the dissolved reactant is depleted from the solvent. Meanwhile, the gas containing the reactant continues to be introduced into the partially saturated pores to supply additional reactant to the solvent.

As the reaction between the reactant and the at least first chemical element of the precursor particles progresses, the peripheral portion of the precursor particle is transformed into the first layer and the second layer. The presence of the first layer at the periphery the core eventually hinders further reaction by separating the reactant and the at least first chemical element of the precursor particle, thereby causing the reaction to effectively stop, leaving a bonding element having the core as the unreacted center of the precursor particle, the first layer at a periphery of the core and a second layer on the first layer.

As a result of the transformation, the core has the same or similar shape as the precursor particle but smaller in size, the first layer and the second layer may each have uniform or non-uniform thickness that partially or fully coat the core and could be porous layer depending on the size and shape of the pores that surrounded the precursor particle during the transformation process. The resulting bonding element comprising the core, the first layer and the second layer, is generally larger in size than the precursor particle, filling in the surrounding porous regions of the porous solid body and possibly bonding with adjacent materials in the porous solid body. As a result, net-shape formation of products may be formed that have substantially the same size and shape as but a higher density than the porous solid body. This is an advantage over traditionally sintering processes that cause shrinkage from mass transport to produce a higher density material than the initial powder compact.

Without being limited by theory, the transformation of the precursor core may be effected because at least a first chemical element is leached out from the precursor particle into the solvent, leaving a depletion zone, which generally excludes the first chemical element except for a finite concentration that forms the first layer. The leached first chemical element is then combined with the reactant of the solvent to form the second layer. The presence of the first and second layers at the periphery the precursor core eventually hinder further reaction by separating the introduced reactant and the first chemical element of the precursor particle, thereby limiting the reaction to a very slow reaction rate that may be halted for practical, leaving a bonding element having the core, the first layer at a periphery of the core and a second layer on the first layer. Another theory is that the multiple chemical elements of the precursor particle are dissolved into the solvent and a first chemical element is precipitated to form the first layer and thereafter remaining cations are precipitated to form the second layer.

In one example of the method of gas-assisted hydrothermal liquid phase sintering, a porous solid body comprising a plurality of precursor particles is placed in an autoclave chamber and heated. Water as a solvent is introduced into the pores of the porous solid body by vaporizing the water in the chamber. A cooling plate above the porous solid body condenses the evaporated water that then drips onto the porous body and into the pore of the porous solid body, thus partially saturating the pores of the porous solid body. However, the method of introducing water in this example is one of several ways that water can be delivered. In another example, the water can be heated and sprayed.

Meanwhile, carbon dioxide as a reactant is pumped into the chamber, and the carbon dioxide diffuses into the partially saturated pores of the porous body. Once in the pores, the carbon dioxide dissolves in the water, thus allowing the reaction between the precursor particles and the carbon dioxide to transform the peripheral portions of the precursor particles into the first and second layers.

In a second embodiment, the precursor particle comprises one or more chemical elements, such as a ceramic material or a metallic material. During the transformation process, a first reactant associated with the liquid reacts with at least a first chemical element in the ceramic or metallic material to form the first layer. A second reactant associated with the liquid then reacts with the first chemical element in a peripheral portion of the first layer to form the second, encapsulating layer. Accordingly, the core comprises the same chemical composition as the precursor particle, including the first chemical element. The first layer comprises a compound that is a combination of the first reactant and the first chemical element. The second layer comprises a compound that is a combination of the second reactant and the first chemical element.

Without being limited by method of manufacturing, the above-described bonding element may be formed by exposing the porous solid body including at least one precursor particle, such as copper, to a first reactant, such as water, to form the first layer by reaction of the water and the copper. Subsequently, a method of gas-assisted hydrothermal liquid phase sintering may be performed. In this method, the core and first layer are exposed to a solvent (such as water), which may or may not initially have a second reactant dissolved therein that reacts with the precursor particle. Meanwhile, a gas containing additional amounts of the second reactant is introduced into the porous solid structure, thereby supplying the second reactant to the solvent for further reaction with the precursor particle.

As the reaction between the second reactant and the first layer progresses, the second reactant continues to react with the first layer, transforming the peripheral portion of the first layer into the second layer. The formation of the second layer may be by the exo-solution of a component in the first layer, and such a second layer may be a gradient layer, wherein the concentration of one of the chemical elements (cations) making up the second layer varies from high to low as you move from the core particle surface to the end of the first layer. It is also possible that the second layer can be a gradient composition as well, such as when the layers are either amorphous or made up of solid solutions that have either constant or varying compositions.

The presence of the second layer at the periphery the precursor core eventually hinders further reaction by separating the second reactant and the first layer, causing the reaction to effectively stop, leaving a bonding element having the core, the first layer at a periphery of the core and a second layer on the first layer. The resulting bonding element is generally larger in size than the original precursor particle, thereby filling in the surrounding porous regions of the porous solid body and bonding with adjacent materials of the porous solid body. As a result, the method allows for net-shape formation of products having substantially the same shape as but a higher density than the original porous solid body. This is an advantage over traditionally sintering processes that cause shrinkage from mass transport to produce a higher density material than the initial powder compact.

Bonding Matrix

The bonding matrix, in accordance with exemplary embodiments of the present invention, comprises a plurality of bonding elements, as previously defined. The bonding matrix may be porous. As explained above, the degree of porosity depends on a number of variables that can be used to control porosity, such as temperature, reactor design, the precursor material and the amount of liquid that is introduced during the transformation process. Thus, depending on the intended application, the porosity can be set to almost any degree of porosity from about 1 vol % to about 99 vol %.

Composite Material

The bonding matrix may incorporate filler material, which would be mixed with the precursor material during the transformation process described above, to create a composite material.

In general, the filler material may include any one of a number of types of materials that can be incorporated into the bonding matrix, such as, for example, an inert material and active material. The inert material is a material that does not go through any chemical reaction during the transformation and does not act as a nucleation site. The active material may consist of a first type that does not go through any chemical reaction during the transformation but acts as a nucleation site and/or a second type that chemically reacts with the bonding matrix during the transformation.

As explained above, the inert material does not go through any chemical reaction during the transformation and does not act as a nucleation site, although it may physically or mechanically interact with the bonding matrix. The inert material may involve polymers, metals, inorganic particles, aggregates, and the like. Specific examples may include, but are not limited to basalt, granite, recycled PVC, rubber, metal particles, alumina particle, zirconia particles, Carbon-particles, carpet particles, Kevlar™ particles and combinations thereof.

As explained above, the first type of active material does not go through any chemical reaction during the transformation but acts as a nucleation site. Additionally, it may physically or mechanically interact with the bonding matrix. For example, when using a bonding element that has a carbonate phase as the second layer, this type of active material may include, for example, limestone, marble dusts and other calcium carbonate-containing materials.

As explained above, the second type of active material chemically reacts with the bonding matrix during the transformation. For example, magnesium hydroxide may be used as a filler material and may chemically react with a dissolving calcium component phase from the bonding matrix to form magnesium calcium carbonate.

More will be said about the use of filler material in conjunction with the bonding matrix, and how the addition of filler material may further improve the function, i.e., material properties, of the resulting composite material.

The bonding matrix may occupy almost any percentage of the resulting composite material. Thus, for example, the bonding matrix may occupy about 1 vol. % to about 99 vol. % of the composite material. Accordingly, the volume fraction of the bonding matrix can be less than or equal to about 90 vol. %, such as 70 vol. %, such as 50 vol. %, such as 40 vol. %, such as 30 vol. %, such as 20 vol. %, such as less than or equal to about 10 vol. %. A preferred range for the volume fraction of the bonding matrix is about 8 vol. % to about 99 vol. %, most preferred range of about 8 vol. % to 30 vol. %.

The composite material, including the bonding matrix and the filler, may also be porous. As explained above, the degree of porosity depends on a number of variables that can be used to control porosity, such as temperature, reactor design, the precursor material, the amount of liquid that is introduced during the transformation process and whether any filler is employed. Thus, depending on the intended application, the porosity can be set to almost any degree of porosity from about 1 vol % to about 99 vol %. For example, the porosity may be less than or equal to about 90 vol. %, such as 70 vol. %, such as 50 vol. %, such as 40 vol. %, such as 30 vol. %, such as 20 vol. %, such as less than or equal to about 10 vol. %. A preferred range of porosity for the composite material is about 1 vol. % to about 70 vol. %, most preferably between about 1 vol. % and about 10 vol. % for high density and durability and between about 50 vol. % and about 70 vol. % for lightweight and low thermal conductivity.

Bonding Matrix Orientation

Within the bonding matrix, the bonding elements may be positioned, relative to each other, in any one of a number of orientations. As such, the bonding matrix may exhibit any one of a number of different patterns. For example, the bonding elements can be oriented in one direction (i.e., a "1-D" orientation), in two directions (i.e., a "2-D" orientation) or three directions (i.e., a "3-D" orientation). Alternatively, the bonding elements may be oriented in a random pattern (i.e., a "random" orientation).

Aforementioned and other bonding element orientation can be achieved by any one of a number of processes. These processes including, but are not limited to, tape casting, extrusion, magnetic field and electric field casting. However, it will be understood that pre-forming the precursor in accordance with any one of these methods would occur prior to transforming the precursor particle according to the transformation method described above. One of ordinary skill would understand how to orient the bonding elements.

Moreover, the concentration of bonding elements in the bonding matrix may vary. For example, the concentration of bonding elements on a volume basis may be relatively high, wherein at least some of the bonding elements are in contact with one another. This situation may arise if filler material is incorporated into the bonding matrix, but the type of filler material and/or the amount of filler material is such that the level of volumetric dilution of the bonding element is relatively low. In another example, the concentration of bonding elements on a volume basis may be relatively low, wherein the bonding elements are more widely dispersed within the bonding matrix such that few, if any of the bonding elements are in contact with one another. This situation may arise if filler material is incorporated into the bonding matrix, and the type of filler material and/or the amount of filler material is such that the level of dilution is relatively high. Further yet, the concentration of bonding elements on a volume basis may be such that all or almost all of the bonding elements are in contact with one another. In this situation, no filler material may have been added, or if filler material was added, the type of filler material and/or the amount of filler material is such that the level of volumetric dilution is almost non-existent.

Figure 2A:
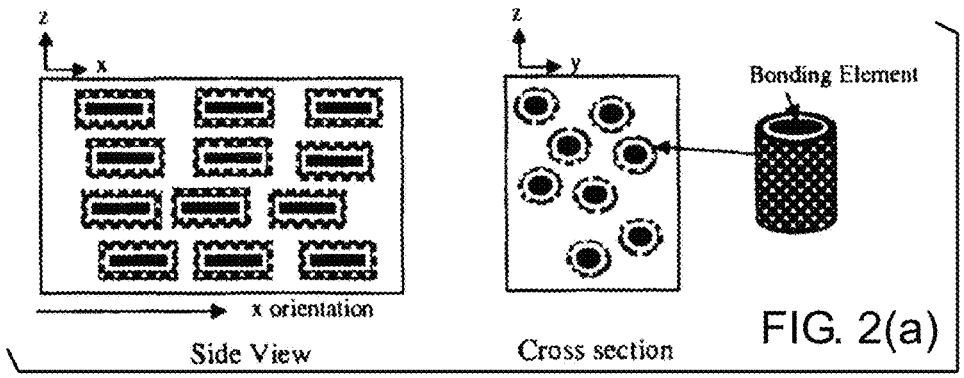
FIGS. 2(a)-2(f) are side view and cross section views of composite materials according to exemplary embodiments of the present invention, illustrating FIG. 2(a) 1D oriented fiber-shaped bonding elements in a dilute bonding matrix (bonding elements are not touching), FIG. 2(b) 2D oriented platelet shaped bonding elements in a dilute bonding matrix (bonding elements are not touching), FIG. 2(c) 3D oriented platelet shaped bonding elements in a dilute bonding matrix (bonding elements are not touching), and FIG. 2(d) randomly oriented platelet shaped bonding elements in a dilute bonding matrix (bonding elements are not touching), wherein the composite materials includes the bonding matrix and filler components such as polymers, metals, inorganic particles, aggregates etc., FIG. 2(e) a concentrated bonding matrix (with a volume fraction sufficient to establish a percolation network) of bonding elements where the matrix is 3D oriented, and FIG. 2(f) a concentrated bonding matrix (with a volume fraction sufficient to establish a percolation network) of randomly oriented bonding elements, wherein filler components such as polymers, metals, inorganic particles, aggregates etc. may be included. Structures comprising a mixture of bonding elements that touch one another and others that are dispersed units are also envisioned but not shown here. The bonding elements can comprise any of the basic multilayered structures shown in FIG. 1 or may have any additional morphologies, but are shown in an abbreviated form for this figure. Cross-sections of representative core particle morphologies are shown for clarity.
Figure 2B:
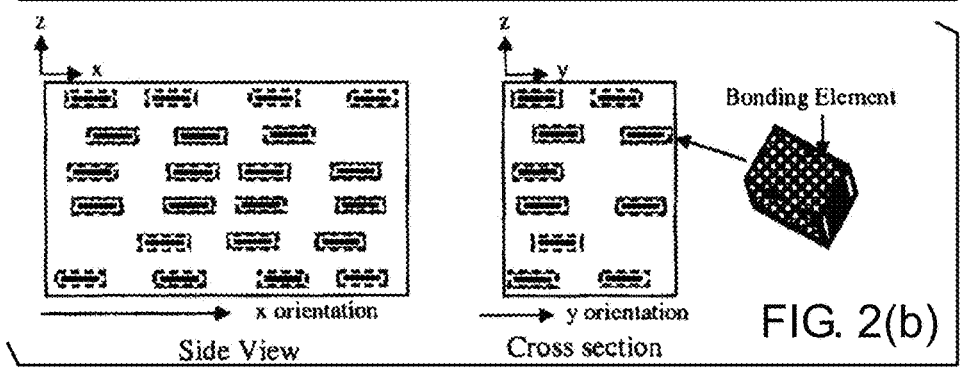
Figure 2C:
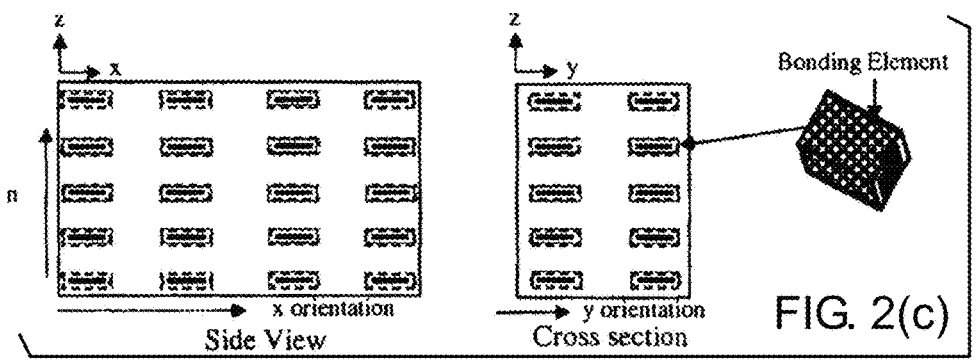
Figure 2D:
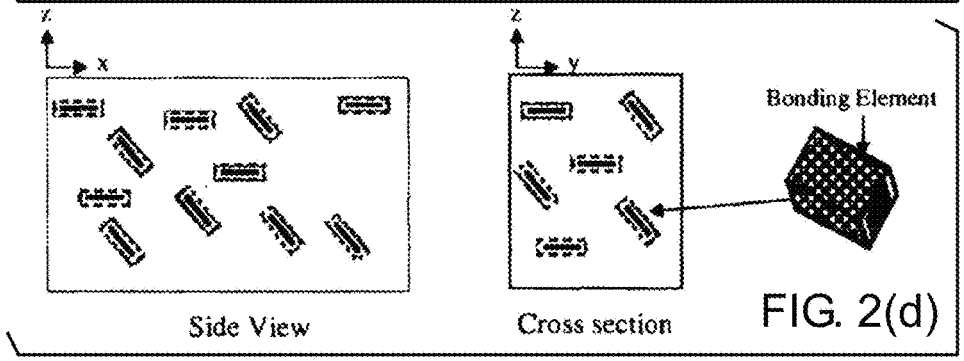

FIGS. 2(a)-2(d) illustrate a bonding matrix that includes fiber- or platelet-shaped bonding elements in different orientations possibly diluted by the incorporation of filler material, as represented by the spacing between the bonding elements. FIG. 2(a), for example, illustrates a bonding matrix that includes fiber-shaped bonding elements aligned in a 1-D orientation, e.g., aligned with respect to the x direction. FIG. 2(b) illustrates a bonding matrix that includes platelet-shaped bonding elements aligned in a 2-D orientation, e.g., aligned with respect to the x and y directions. FIG. 2(c) illustrates a bonding matrix that includes platelet-shaped bonding elements aligned in a 3-D orientation, e.g., aligned with respect to the x, y and z directions. FIG. 2(d) illustrates a bonding matrix that includes platelet-shaped bonding elements in a random orientation, wherein the bonding elements are not aligned with respect to any particular direction.

Figure 2E:
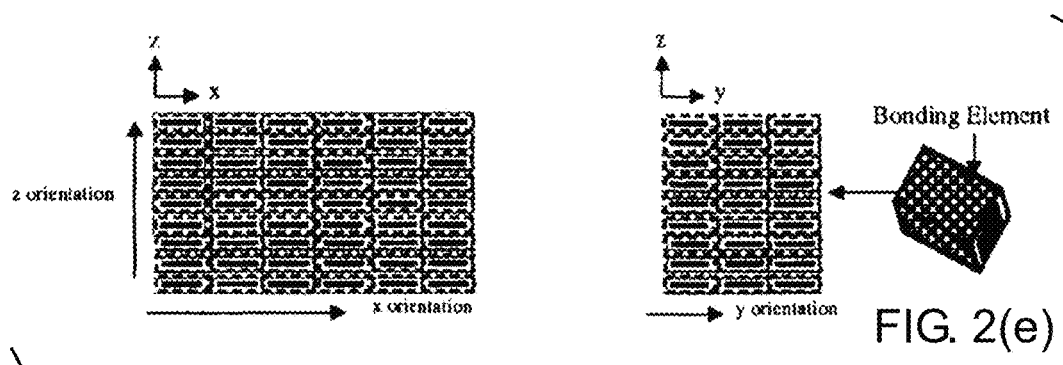
Figure 2F:
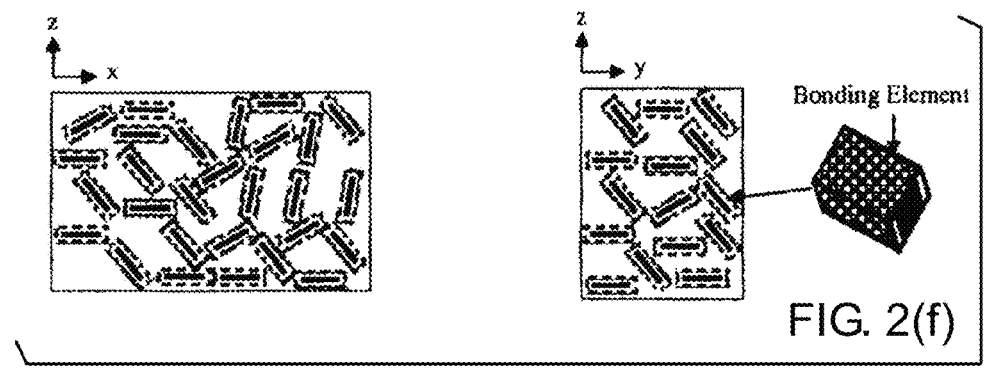

FIGS. 2(e)-2(f) illustrate a bonding matrix that includes platelet-shaped bonding elements in two different orientations and concentrations. FIG. 2(e), for example, illustrates a bonding matrix that includes a relatively high concentration of platelet-shaped bonding elements that are aligned in a 3-D orientation, e.g., aligned with respect to the x, y and z directions. The relatively high bonding element concentration is illustrated by the lack of filler material around the bonding elements; thus, there is little to no dilution of the bonding elements. In contrast, FIG. 2(f) illustrates a bonding matrix that includes a relatively low concentration of platelet-shaped bonding elements that are situated in a random orientation. The relatively low bonding element concentration is illustrated by the presence of filler material around the bonding elements; thus, there is at least some dilution of the bonding elements. Due to the concentration and orientation of the bonding elements in FIG. 2(f), the composite material may be referred to as a percolation network. The composite material of FIG. 2(f) achieves the percolation threshold because a large proportion of the bonding elements are touching one another such that a continuous network of contacts are formed from one end of the material to the other end.

The percolation threshold is the critical concentration above which bonding elements show long range connectivity with either a ordered (FIG. 2(e)) or random orientation (FIG. 2(f)) of bonding elements.

In addition to orientation and concentration, the bonding elements in the bonding matrix can be arranged such that they exhibit a certain connectivity pattern with the filler material. Such connectivity patterns are described in, for example, Newnham et al., "Connectivity and piezoelectric-pyroelectric composites", Mat. Res. Bull. Vol. 13, pp. 525-536, 1978).

Figure 3:
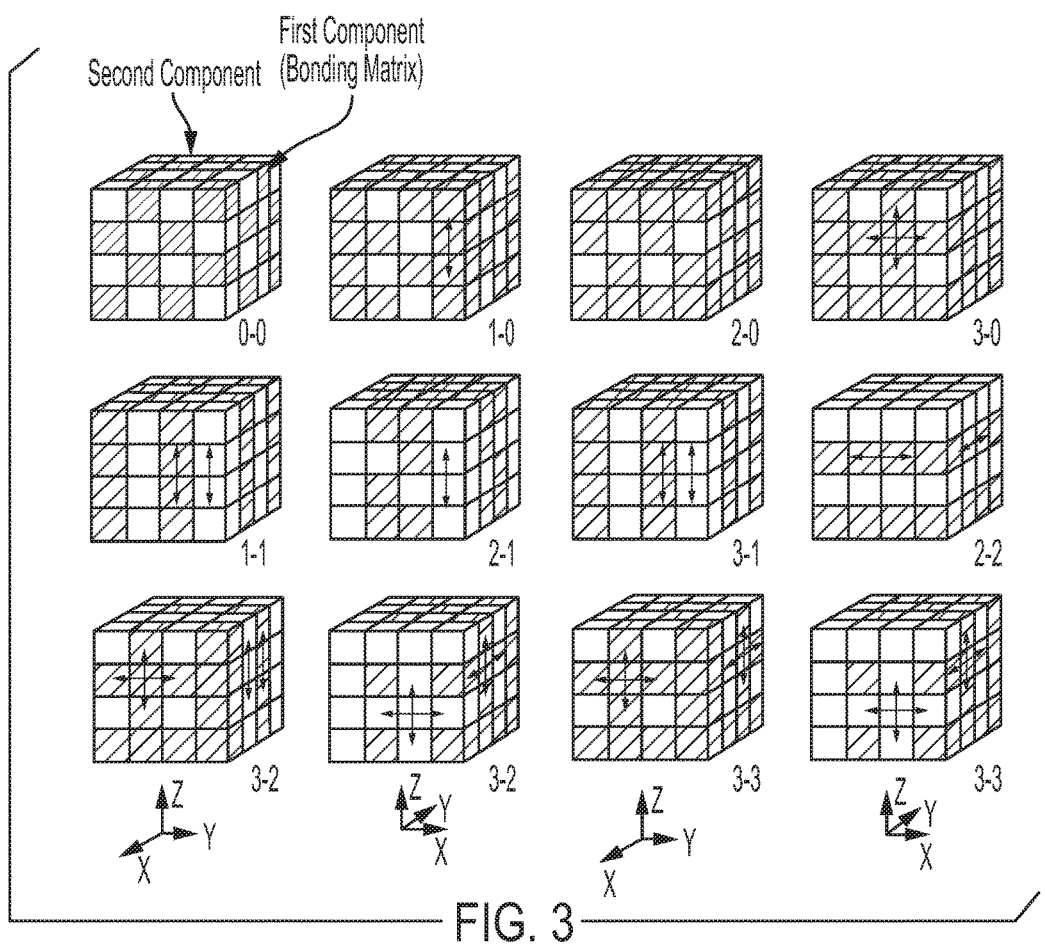
FIG. 3 illustrates different connectivity patterns in two component composite materials systems according to exemplary embodiments of the present invention. Shaded regions show the regions of bonding matrix, and non-shaded regions are filler components, such as metals, aggregates, inorganic particles or polymers.

FIG. 3 illustrates a number of different connectivity patterns for an exemplary composite material including connectivity patterns 0-0, 1-0, 2-0, 3-0, 1-1, 2-1, 3-1, 2-2, 3-2, 3-2, 3-3 and 3-3. In FIG. 3, the exemplary composite material has two components, a first (shaded) component which may represent the bonding matrix, and a second (un-shaded) component that may represent filler material. The different types of connectivity patterns can be exploited to achieve desired material properties associated with the composite material.

Figure 4A:
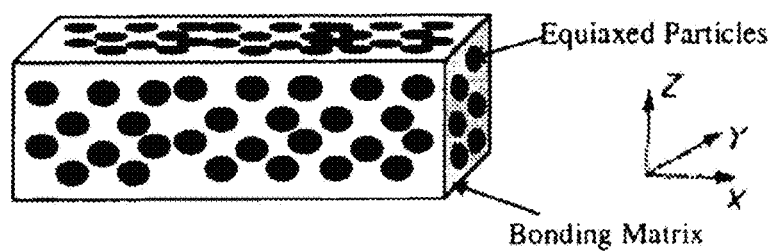
FIGS. 4(a)-4(b) show in FIG. 4(a) a 3-0 composite material according to exemplary embodiments of the present invention, comprising a bonding matrix and equiaxed filler particles randomly distributed in the bonding matrix, and FIG. 4(b) 3-1 composite material according to exemplary embodiments of the present invention comprising bonding matrix and oriented fiber-shaped filler components.
Figure 4B:
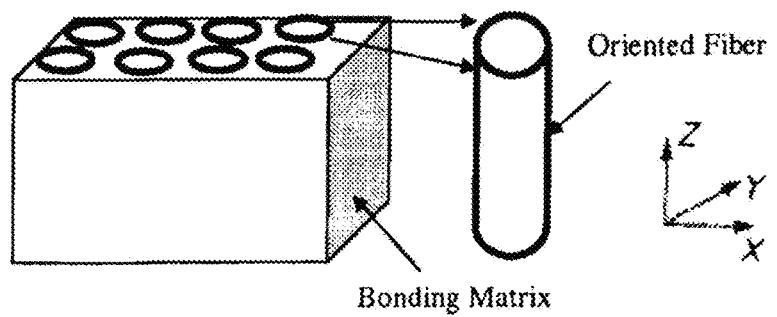

FIGS. 4(a)-4(b) illustrate examples of a composite material that comprises a bonding matrix (white portion) and equiaxed filler particles or anisotropic fibers, respectively. In the case of FIG. 4(a), the equiaxed filler particles are arranged in a random orientation, whereas the bonding matrix is aligned along all three axes. Thus, it can be said that the connectivity pattern of the composite material in FIG. 4(a) is a 3-0 connectivity pattern. In the case of FIG. 4(b), the anisotropic filler fibers are arranged in 1-D orientation with respect to the z direction. Thus, it can be said that the connectivity pattern of the composite material in FIG. 4(b) is a 3-1 connectivity pattern. Again, depending on the application and the desired material properties, the filler material may be any one of a plurality of inert and/or active materials.

Hierarchical Structure

Different types of bonding matrices can be created by varying the matrix porosity and by incorporating core fibers of different sizes (as seen in Tables 3 and 4 below). If FB1 composition is an example of bonding matrix (Table 3), this bonding matrix can be used to form repeating 1, 2, 3, 4, or higher levels of hierarchic structures. The level of hierarchic structure can refer to the number of length scales where an important structural feature is introduced (FIGS. 13(a)-13(d)). Different kinds of particulate and fiber components can be used with, for example, 1-, 2-, 3-, or higher level hierarchic structures to fabricate different kinds of structures with different connectivity as shown in FIG. 3.

TABLE 3

Variation of compressive strength in different bonding matrices formed by using different core fiber dimensions

| Composition | Median fiber size (d50) | Compressive Strength (MPa) |
|---|---|---|
| FB1A | 9 μm (as-given by manufacturer, NYAD 400) | 163 ± 8 |
| FB1B | 9 μm (as-given by manufacturer, NYAD 400) | 147 ± 24 |
| FB2 | 15 μm (as-given by manufacturer, NYAD M200) | 136 ± 6 |
| FB3 | 70 μm (as-given by manufacturer, NYAD M100) | 60 ± 14 |
| FB4 | 30 vol. % (−7 to +14 mesh (~1400-2800 μm) of NYCOR 100), 30 vol. % (−14 to +100 mesh (~1400-150 μm) of NYCOR 100), and 40 vol % (−400 mesh, NYAD 400) | 72 |

TABLE 4

Effect of porosity of bonding elements fabricated with fiber cores of $d_{50}$ = 9 μm on compressive strength

| Composition | Porosity (%) | Compressive Strength (MPa) |
|---|---|---|
| P1 | 45 | 10 |
| P2 | 38 | 40 ± 5 |
| P3 | 23 | 110 ± 10 |
| FB1A | 17 | 163 ± 8 |

Hierarchy describes how structures form patterns on several length scales. The examples described above are but one example of how the bonding elements may be hierarchically employed in a manner that can promote dense packing, which provides for making a strong material, among other potential useful, functional purposes.

An illustration of the multilevel repeating hierarchic structure is shown in FIGS. 13(a)-13(d) wherein an ordered hierarchic structure can repeat at different length scales, such as 1 or more length scales.

For example, a 1-level repeating hierarchic system can be described as a composite formed by blending two different size or particle size ranges, generally differing by an order of magnitude. The larger size particles can arrange in different types of packing like Hexagonal Close Packing, or Cubic Close Packing, or Random Packing, but not limited to these, to form a network that contains interstitial void spaces, and the particles of smaller size can nestle in voids of particles of larger size. Ideally, these hierarchic systems can be prepared by using particles of same size in each level, for example spherical particles with 1 mm diameter are filling interstitial void spaces of packed spherical particles with 10 mm diameter. However, in practice, it is difficult to obtain mono-dispersed particles, consequently, hierarchic systems will be illustrated by using modal continuous distributions of particle size. For example, FB1B type bonding elements ($d_{50}$≈9 μm) can fit in the voids of filler particles of particle size varying between (100-500) μm (FIG. 13(a)). In order to further enhance connectivity of the bonding matrix in the structure, a coating of FB1B type bonding elements can also be applied to coarser filler particles and consequently these FB1B type bonding elements can fill the void spaces of coated coarser filler particles (FIG. 13(b)). Another alternative method of making 1-level hierarchic structure would be to use fine filler particles (<1 μm median particle size) in voids of FB1B bonding matrix.

For example, 2-level hierarchic system can be described as a composite of 1-level hierarchic system combined with larger or smaller particles whose particle size differs by an order of magnitude from either the coarser or finer particles in 1-level hierarchy. For example, in the present example, FB1B type bonding elements in voids of medium filler particles between (100-500) μm, and subsequently this 1-level hierarchic system uniformly distributed in voids of coarser 1-5 mm aggregates (FIG. 13(c)). In order to enhance connectivity of the bonding matrix further, a thin coating of FB1B bonding matrix (Table 3) can be applied on both coarser and medium filler particles (FIG. 13(d)).

For example, a 3-level hierarchic system can be described as a composite of 2-level hierarchic system combined with larger or smaller particles differing by an order of magnitude than either the largest or the smallest particle in 2-level hierarchy. For example, <1 micron fine filler particles in the voids of FB1B matrix forming a 1-level hierarchy, and subsequently this 1-level hierarchy in voids of larger filler particles between 100-500 μm forming a 2-level hierarchy, and finally this 2-level hierarchy in voids of 1-5 mm filler aggregates forming a 3-level hierarchy. Along the same line, a higher order, n level hierarchic system can be generated. As the levels of hierarchy increase, the range of length scales encompassing the various levels also increases. Thus, as n increases to infinity, so does the length scale. This huge range of length scale and hierarchy provides an infinite ways to deploy our novel bonding element in materials.

It is also possible to use bonding elements with different particles from different size fraction ranges to enhance packing by using non-repeating hierarchic or random packing systems also. As such, the organization of particles is either not repeating and hierarchic—some may consider this hierarchic in structure but having different structure in the geometric sense at different length scales, or random packing which implies particles are mixed randomly without incorporating non-random structures such as interstitial packing of large pores with fine particles or coatings of one particulate component on top of another.

These packing strategies can lead to high bulk densities, which can be manifested by small water absorption values. For example, water absorption of FB1B (Table 3) is 7.7±0.6 wt % (5h boiling water test, ASTM C 67). If two components of different size ranges are used, for example, when FB1B Wollastonite fiber cores is blended with sand (CPC2, Table 12) packing is improved, and water absorption decreases to 5.3±0.5 wt %. Similarly, when particles from three size fractions are used, namely, FB1B Wollastonite fiber cores blended with sand (particle size between 300-500 microns) and basalt aggregates (particle size between 6-8 mm), water absorption is further decreased to 3.1±0.9 wt %. Alternatively, if 1 wt. % fumed silica ($d_{50}$<1 μm) is added in CPC2 type composition then water absorption is decreased further to 2.6 wt %.

Use of Bonding Matrix

The bonding matrix, including the bonding elements described above can be used to customize and, therefore, improve the material properties of almost any article that has a microstructure that can be modified by the incorporation of the bonding matrix, such as cement or concrete. In one example, the bonding matrix can be employed as a partial or complete substitute for Portland cement, and used as a hydrate-free bonding phase for components typically used in a wide range of concrete products, thereby improving various material properties associated with those products.

The material properties of the composite material that may be improved as a result of the incorporation of a bonding matrix, including bonding elements, in accordance with exemplary embodiments of the present invention, include mechanical properties, thermal properties and durability. However, specific mechanical, thermal and durability properties other than those listed in Table 19 may be improved as well. Additional material properties such as optical properties, electronic properties, catalytic properties, nuclear properties and magnetic properties may also be improved.

By way of example, a composite material comprising a bonding matrix in accordance with exemplary embodiments of the present invention may exhibit improved damage tolerance under compression. Hereinafter, exemplary wollastonite particles are generally referred to as having a fiber shape for simplicity. However, the wollastonite particles may have any generally anisotropic morphology, such as having an acicular or fiber like shape.

Figure 9:
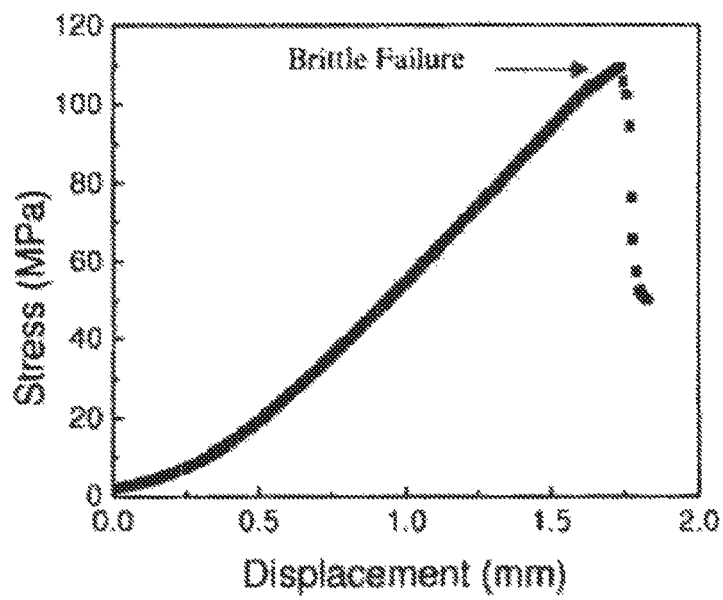
FIG. 9 shows a stress versus displacement curve of a P3 bonding matrix (also see Table 4) in compression of an embodiment of the present invention.

With reference to FIG. 9, a material composed of smaller wollastonite cores (Composition P3 in Table 4, FIG. 9) exhibits sudden brittle fracture due to stress in compression. However, with reference to FIG. 10 (Composition FB4 in Table 3, FIG. 10), the incorporation of the longer wollastonite fiber cores in bonding matrix causes a series of crack deflections to occur, where each deflection provides relief (i.e., "damage recovery") of the stress accumulation, thereby delaying the onset of ultimate failure. Another way, in which the bonding matrix may sudden brittle failure with more gradual failure, is by employing a plurality of core particle sizes and fine filler particles in the encapsulating layer (FIG. 12(a)). For example, fine particles, such as silica particles, can be dispersed in a bonding matrix with porosity. With reference to compound FB4 in Table 3, the core may comprise particles of three different sizes at three volume fractions. A larger or smaller number of sizes (e.g., 2, 4, 5, 6, or more) or different volume fractions can be used. The bonding matrix can then act as a hydrate free cementing phase in the composite by binding to itself and the fine particles. Such a composite microstructure would allow for gradual failure, as demonstrated in FIG. 12(b).

In this example, the crack propagation mechanism is being altered because of the different interfaces formed in the bonding matrix. The core particle(s) can act as a crack deflector. Additionally, a first interface is formed between the core and the first layer, and a second interface is formed between the first layer and the encapsulating layer. The two different interfaces can have the same or different strengths. For example, the first interface can be higher interfacial strength (e.g., mechanical strength) than the second interface, and vice versa. As a result, after a crack is initiated and begins to propagate, the crack could be deflected from a stronger phase and instead propagate along the weaker interface, causing debonding therein.

It has been demonstrated that a composite material including the bonding matrix can exhibit improved mechanical properties as set forth in the present disclosure. Also, as demonstrated in Table 10, the article can have a higher thermal conductivity and a lower thermal expansion coefficient than conventional Portland cement. Furthermore, it is believe that various composite materials according to the present invention may also exhibit a wide range of properties, such as those shown in Table 5. It should be understood that exemplary embodiments of composite materials may also have properties corresponding to subsets of the ranges listed in Table 5. For example, embodiments may include composite materials that have a thermal expansion coefficient between $3\times10^{-6}/°$ C. and $15\times10^{-6}/°$ C. Exemplary embodiments of composite material may exhibit a thermal conductivity of greater than about 0.13 W/m·k, and less than about 196 W/m·k. Exemplary embodiments of composite material may exhibit a heat capacity between 6 and 900 J/mole·K. Exemplary embodiments of composite materials may exhibit a Vicker's hardness between about 1 GPa and 30 GPa. Further exemplary embodiments include composite materials that may exhibit a compressive strength varying between 14 to about 3,000 MPa and a flexural strength of less than about 380 MPa. Exemplary embodiments of composite materials may also exhibit creep strain of less than $60\times10^{-6}$/psi. Exemplary embodiments of composite materials may exhibit Cl⁻ permeability of less than 700 C. Exemplary embodiments of composite materials may be self reinforced and have a ball impact resistance greater than 6 J. Exemplary embodiments of composite materials may also be reinforced with steel fibers and have a ball impact resistance greater than 10 J. Moreover, exemplary embodiments of composite materials may exhibit combinations of the above sub-ranges of properties and/or of those ranges of properties listed in Table 5.

TABLE 5

Upper and lower limit of different properties of composite material in accordance with embodiments

|  | Lower Limit | Upper Limit |
| --- | --- | --- |
| Mechanical Properties |  |  |
| Compressive Strength | 1 kPa | 8-16 GPa[1] |
| Flexural Strength | 1 kPa | 655 MPa[2] |
| Hardness | 1 kPa | 147 GPa[1] |
| Modulus of Elasticity | 1 kPa | 700-1200 GPa[1] |

TABLE 5-continued

Upper and lower limit of different properties of composite material in accordance with embodiments

|  | Lower Limit | Upper Limit |
|---|---|---|
| Fracture Toughness (MPa · m$^{1/2}$)[3] | 0.0008 | 66 |
| Creep testing by C512-02 (construction materials) | 99% strain to failure | No deformation during the entire course of testing |
| High Temperature Creep[4] | — | At 400 MPa and 1800° C., creep rate less than $10^{-6} s^{-1}$ |
| Impact Resistance (Construction Materials) | — | Will Pass ASTM E-1886 or ASTM E-1996, or Dade County Standard |
| Impact Resistance (Armor) | — | 250 tons per square centimeter - shock pressure[5] |
| Ductility | Brittle | Metal like ductility |
| Castability | Granulated powders | Can be cast into complicated shapes or be self-flowing, or vibration assisted flows |
| Thermal Properties | | |
| Thermal Conductivity (W/m · K) | 0.03 | 2000[1] |
| Heat Capacity $C_{p, m}$ J/(mol · K) | 6 | 900 |
| Thermal Expansion ($10^{-6}$° C./min) | 1-2 | 15 |
| Max working temperature (° C.) (air) | Cryogenic conditions | 2927 (Note: MP of CaO) |
| Fire Resistance | — | ASTM E119 or ASTM E 84 |
| Max working temperature (° C.) (Ar or inert atmosphere)[6] | Cryogenic conditions | 4215 |
| Shock Resistance (Construction Materials) | — | Pass ASTM C484 |
| Shock Resistance (Refractory)[7] | — | 500° C. thermal quenching |
| Durability | | |
| Chloride Permeability (Coulombs) ASTM C 1202 | >2000 | Negligible permeability |
| Abrasion Resistance ASTM C944 | >2 mm | Negligible wear |
| Freeze and Thaw (ASTM C666 for concrete) | 0 | 300 cycles or higher and retain DF of 100 |
| Freeze and Thaw (ASTM C 67) | 0 | 50 cycles or higher |
| Acid Freeze Thaw (C666 and C67) | 0 | Pass one or both standards |
| Shrinkage (ASTM C 157) | NA | Negligible Shrinkage |
| Sulphate resistance (ASTM C150/C150M - 09/ C1012) | Comparable to OPC | Performance Equal or better than Type V cement (<0.04% expansion) |
| alkali-silicate reaction (ASR) (ASTM C 1260) | Fail ASTM C 1260 | Negligible expansion |
| UV Exposure (G 154) | Will be damaged by UV | No effect after 5000 h |
| Salt Spray Resistance (B 117) | Fail the test | Pass ASTM B117 |
| Water absorption (5 h boiling water test) | 99 wt. % water absorption | No water absorption |
| Tribological Behavior | | |
| Coefficient of Friction[8] | 0.02 | 1.05 |
| Wear Rate (mm$^3$/N · m) | >1 | <$10^{-8}$ |
| Optical Properties | | |
| Albedo (Reflectivity)[9] | 0.04 | 0.9 |
| Band Gap[10] (eV) @ 300K | 0 | 6.36 |

[1] http://www.matweb.com/search/DataSheet.aspx?MatGUID=d8d230a8d9664bc390199dab7bc56e1e&ckck=1
[2] http://www.insaco.com/matpages/mat_display.asp?M=SIC-RB
[3] http://en.wikipedia.org/wiki/Fracture_toughness
[4] http://www.hexoloy.com/
[5] http://www.physorg.com/news8947.html
[6] http://chemicalproperties.org/property/melting-point/
[7] http://www.ferroceramic.com/Cordierite_table.htm
[8] Kurt Kleiner (2008 Nov. 21). "Material slicker than Teflon discovered by accident". http://www.newscientist.com/article/dn16102-material-slicker-than-teflon-discovered-by-accident.html. Retrieved 2008 Dec. 25.
[9] http://en.wikipedia.org/wiki/Albedo#cite_note-heat-island-0
[10] Evans, D A; McGlynn, A G; Towlson, B M; Gunn, M; Jones, D; Jenkins, T E; Winter, R; Poolton, N R J (2008). "Determination of the optical band-gap energy of cubic and hexagonal boron nitride using luminescence excitation spectroscopy". *Journal of Physics: Condensed Matter* 20: 075233. doi: 10.1088/0953-8984/20/7/075233.

Applications

The presently described bonding matrix and/or bonding element can be used in a variety of applications. Because of the superior properties of these bonding element/matrix as described herein, the element/matrix can be used in applications in electronic, optical, magnetic, biomedical, biotechnological, pharmaceutical, agricultural, electrochemical, energy storage, energy generation, aerospace, automotive, body and vehicle armor, textile, and abrasive and cutting applications, and any combination of foregoing applications. It can also be used as photochemical, chemical separations, photoelectric, thermionic and/or electroluminescent materials.

Some of the illustrative examples are provided below:

The bonding element or matrix can be used as a cementitious phase like Portland Cement, lime cement, or related cementitious materials. These solids can be applied in any applications of Portland Cement, lime cement or related cementitious materials.

The bonding element/matrix can be blended with additives, including $CaCO_3$, or gypsum, and sand, to form monolithic solids. Monolithic solids are solids that are formed as a single piece, without joints or seams. For the purposes of this specification, the term "monolithic" is not being used or intended to be used to describe uniformity at a microscopic level. Examples of the monolithic solids can mimic and/or resemble the performance as well as the appearance of Terracotta, or natural stones, such as granite and limestone. The appearance can be created by further forming different colors and textures with additives. In one embodiment, these monolithic solids can be used in any applications wherein conventional Terracotta, or natural stones are employed.

The bonding element or matrix can also be blended with sand, or other minerals to prepare mortar or grout, and the resultant material can be used in any applications wherein conventional mortar and grout are employed.

The bonding element/matrix can also be blended with metallic, or organic, or ceramic fibers to make a fiber cement. The resultant material can be used in any applications wherein conventional fiber cements are employed.

The bonding element or bonding matrix can be used in hydrate-free concrete applications. In one embodiment, it can be blended with sand and aggregate and/or aggregates to form a material that mimics and/or resembles regular or structural concrete. The resultant material can be used in any applications wherein conventional structural or regular concrete are employed, e.g., dams, bridges, swimming pools, homes, streets, patios, basements, balustrades, plain cement tiles, mosaic tiles, pavement blocks, lamp-posts, drain covers, or combinations thereof.

By careful sizing of the particles, dispersants, and/or wastes, such as cork, glass aggregates, resultant materials that mimic and/or resemble High Strength Concrete (HSC), 3D fiber type structures (e.g., concrete clothes), Rapid Strength Concrete (RSC), cork based composites, glass concrete, and High Performance Concrete (HPC) can be produced. The resultant material can be used in any applications in which conventional HSC, concrete clothes, RSC, cork based composites, glass concrete, HPC are employed.

Steam and/or vacuum during process can be further used to produce material that mimics/resembles Vacuum Concrete (VC) and that can be used in any applications in which conventional VC is used. In one alternative embodiment, by controlling the porosity, a resultant material that mimics/resembles Pervious Concrete can be produced. The material can be used in any applications, in which conventional Pervious Concrete is employed.

In one embodiment, the bonding element/matrix is blended with fibers, sand, aggregates, and/or other additives, such as defoamers and/or ultrafine particles, such as fumed silica and $CaCO_3$, to prepare fiber reinforced concrete (FRC) which performs like Fiber reinforced composites and/or Ultra High Performance Concrete (UHPC). These solids can be used in any applications, in which conventional FRC and/or UHPC is employed. In an alternative embodiment, by controlling the fluidity (e.g., by tailoring the water content during processing), other installation types of concrete products can be produced. The products included Shotcrete, Self Compacting Concretes, Roller Compacted Concretes, or combinations thereof.

In another embodiment, the bonding element/matrix is blended with a metal such as aluminum and $Ca(OH)_2$ and autoclaved, or by controlling porosity by using different aids like vacuum, or air entrainment to produce a material that mimics/resembles Autoclave Aerated Concrete (AAC). This material can be used in any applications in which conventional AAC is employed.

In an alternative embodiment, the bonding element/matrix is blended with sand and/or low density aggregates (e.g., expanded vermiculite and perlite, pumice, expanded slag, expanded shale, or combinations thereof), and by controlling porosity, these composites can be used as light-weight concretes or Cellular concrete, light-weight aerated concrete, variable-density concrete, foamed concrete or ultra light-weight concretes or any other material related to these types of concretes. In another embodiment, the bonding element/matrix is blended with high density aggregates (e.g., density>3.2 $g/cm^3$), and the resultant product can be heavy-weight concretes.

The presently described bonding element/matrix can be used in combination (and thus reinforced) with steel to make reinforced concrete material, which can be used in any applications in which reinforced concrete structures are employed. The material can be pre-stressed to mimic/resemble Pre-stressed Concrete. In one embodiment, the bonding element/matrix can be poured in huge blocks to produce a material that mimics/resembles mass concrete. Applications for these mass-concrete types of material can include gravity dams, large breakwaters, or a combination thereof. The concrete derived from the presently described bonding element/matrix can also be fabricated with different textures for decorative purposes.

In some embodiments, a composite material comprising the presently described bonding element/matrix can have superior properties. For example, it can have excellent corrosion resistance, such as providing protection to steel reinforcement in an environment with high chloride content, and excellent durability in aggressive sulphate environments. A composite material can be used in highly specialized applications, such as sound shielding and/or or nuclear radiation shielding. In one embodiment, the material can have desirable fire resistance, and can be suitable for refractory applications. The material can also withstand extreme weather conditions, such as, for example, freezing conditions, high temperatures in deserts, or extreme weather fluctuations, and/or freeze-thaw resistance. The material can also be suitable for use in specialized marine, cryogenic, and/or blast resistance applications. In some embodiments, the material can be used in earthquake resistant structures and/or geosynthetic type structures.

NON-LIMITING WORKING EXAMPLES

Example 1

Figure 5A:
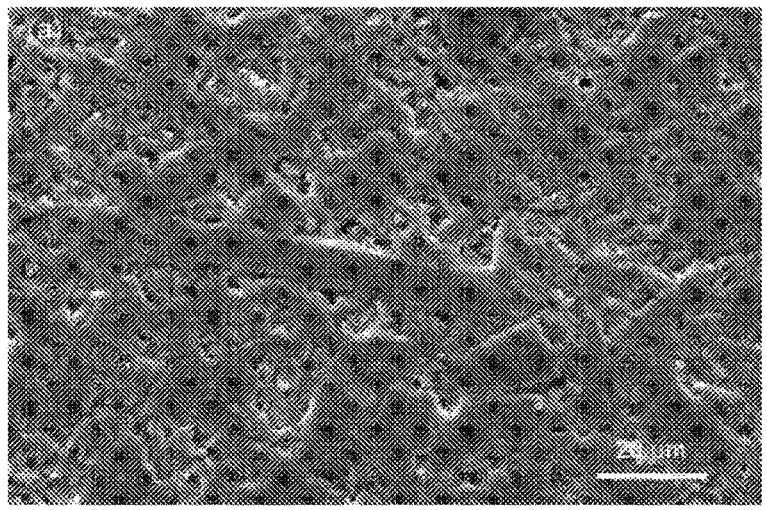
FIGS. 5(a)-5(b) show FIG. 5(a) secondary electron (SE) and FIG. 5(b) back scattered electron (BSE) scanning electron microscopy (SEM) images of a bonding matrix according to an exemplary embodiment of the present invention, composed of crystalline wollastonite core fibers encapsulated by amorphous silica and surrounded by $CaCO_3$ particles.
Figure 5B:
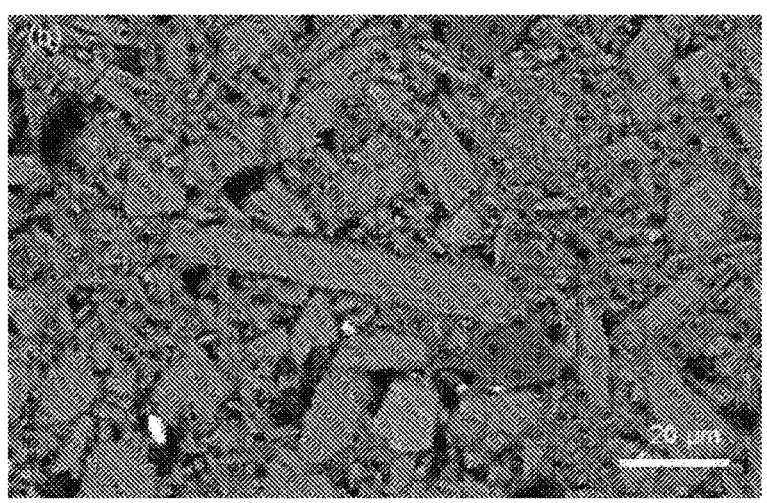
Figure 6A:
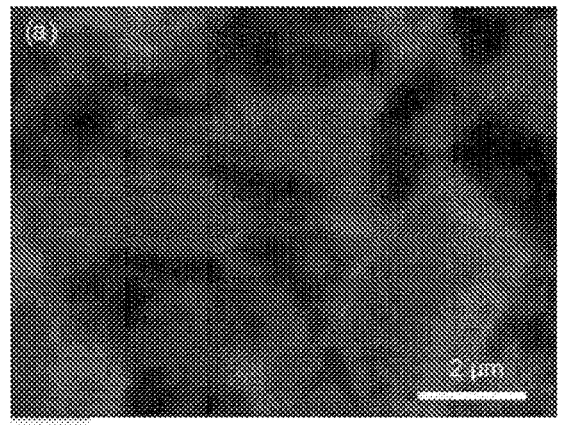
FIGS. 6(a)-6(c) show energy-dispersive X-ray spectroscopy (EDS) chemical mapping of a bonding matrix according to an exemplary embodiment of the present invention, illustrating superposition of Si (FIG. 6(a)) and Ca (FIG. 6(b)) map.
Figure 6B:
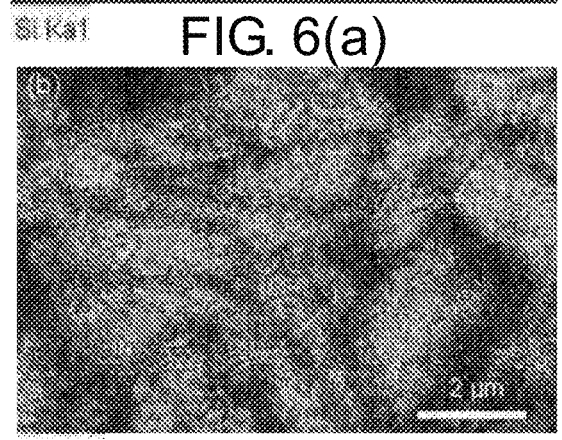
Figure 6C:
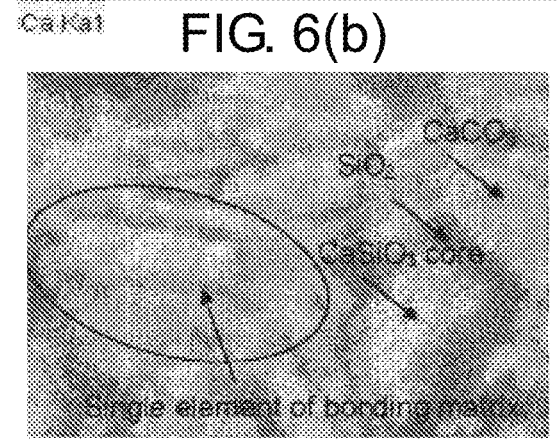

FIGS. 5a and 5b show secondary electron (SE) and back scattered electron (BSE) SEM images of randomly oriented $CaSiO_3$ core fibers coated by predominantly amorphous silica, and these coated fibers are encapsulated with $CaCO_3$ particles. Chemical mapping by EDS in FESEM of the microstructure showed wollastonite core fibers are coated by $SiO_2$ rich regions and encapsulated by $CaCO_3$ particles (FIG. 6(c)). Different elements of bonding matrix are held together by $CaCO_3$ particles. XRD of this composition revealed that $CaSiO_3$ and $CaCO_3$ (calcite) are crystalline phases whereas silica rich regions are amorphous.

Table 6 compares mechanical properties of conventional monolithic materials with different compositions (Tables 3 and 4) formed by using a wollastonite core fiber-based bonding matrix. These bonding matrices showed a range of compressive strengths between 40 and 300 MPa. Moreover, compressive strength can be tailored by both the fiber core unit size and porosity. The highest strength observed in this bonding matrix has a comparable strength to a dimension stone like granite. FB1A and FB1B samples were prepared by pressing and casting forming methods, respectively, prior to conducting the disproportionation reaction. These two different ceramic forming techniques lead materials with slightly different compressive strengths because of different ways the raw materials pack (Table 3). In addition, FB1A matrix based smaller samples (diameter=12.8 mm) an average strength of 298±5 MPa has been observed. These results indicate that it is possible to further enhance strength in these solids by reducing the defect populations further by more advanced processing. There are many conventional methods of powder processing that can be used to reduce the defect populations and in turn allow larger samples to results that have these improved mechanical properties. This process of optimization is possible with someone of ordinary skill given the use of this novel bonding element technology.

TABLE 6

Comparison of compressive strength of different materials

| Material | Compressive Strength (MPa) |
|---|---|
| Chalk[1] | 3-4 |
| Portland Cement[2] | 30-50 |
| Marble[3] | 50 |
| Granite[3] | 130-200 |
| Limestone[3] | 12 |
| Terracotta[4] | 65 |
| Bonding Matrix (Tables 3 and 4) | 40-300 |

Figure 7:
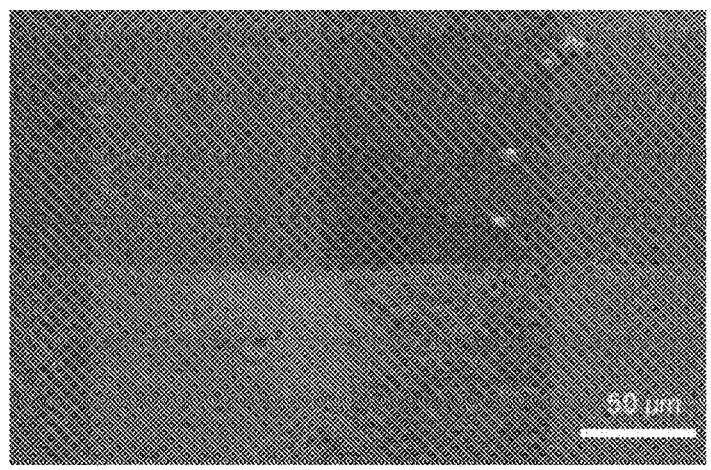
FIG. 7 shows a field emission scanning electron microscopy (FESEM) image of a Vicker's hardness indentation of 20 N on a P3 bonding matrix (Table 6) according to an embodiment of the present invention.
Figure 8A:
FIGS. 8(a)-8(c) show FESEM micrographs of FIG. 8(a) an indentation (SE Image), FIG. 8(b) higher magnification of point marked D in (b) (BSE Image), and FIG. 8(c) a robust interface between the core wollastonite grain and silica phase coating.
Figure 8B:
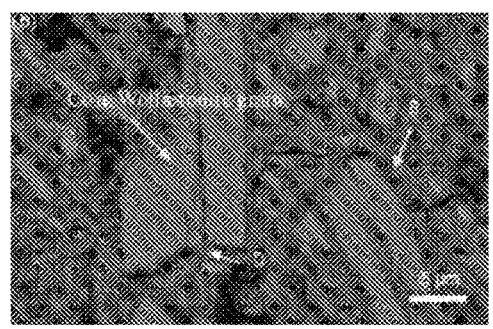
Figure 8C:
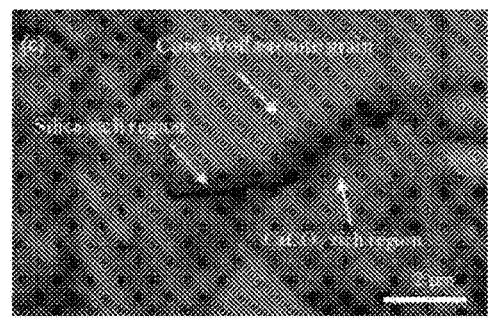

[1]Anne Duperret, Said Taibi, Rory N. Mortimore, Martin Daigneault, Effect of groundwater and sea weathering cycles on the strength of chalk rock from unstable coastal cliffs of NW France", Engineering Geology 78 (2005) 321 343.
[2]S. Mindess, J. F. Young, and D. Darwin, Concrete, Second Edition, Prentice Hall (2003).
[3]http://www.supremesurface.com/granite/granite.html,
[4]http://content.wavin.com/WAXUK.NSF/pages/Terracotta-Performance-Data-EN/$FILE/performance_data.pdf FIG. 7 shows a Vicker's Hardness Indentation on a composite material with microstructure described in Example D (composition P3, Table 4). This composite material had a hardness of ~1.6 GPa. Cracks emanating from the corner of the indentation were studied subsequently to understand crack propagation (FIG. 8(a)). B and D regions show that the crack has deviated around different fiber shaped wollastonite core fibers by debonding in the interface between silica rich and $CaCO_3$ rich regions (FIG. 8(a)). These core fibers act as crack deflectors, and cracks subsequently deviated around them and propagated through $CaCO_3$ rich phases present at interface boundaries (FIG. 8b). Accordingly, the interface between coated silica and $CaCO_3$ rich region is weak, as compared to robust interface between core wollastonite grain and silica phase coating (FIG. 8(c)). This unique interface structure can be used to design structures in which cracks are deflected by debonding which increases the damage tolerance of these structures against sudden brittle failure. P3 composition showed brittle failure and had a compressive strength of 110 MPa (FIG. 9) and a tensile strength of 12 MPa.

It is further possible to tailor the hardness of these composite materials by making composite materials with different additives like carbides, silicates, glass, and glass ceramics or even different types of metals and polymers. For simplicity, hardness calculations are done by assuming 30 vol. % P3 bonding matrix blended with different additives, and subsequently, by using a rule of mixture calculation, different range of hardness values can be calculated. For example, by adding BeO, a hardness of 1-1.3 GPa can be achieved, and by adding $B_4C$, a hardness of 21-27 MPa can be achieved also as shown in the Table 7. In other exemplary embodiments the material can have a Vicker's Hardness between about 1 GPa and about 30 GPa.

TABLE 7

Summary of calculated hardness values of different composites made with P3 Bonding Elements.

| Material | Single Phase Hardness (GPa) | 30 Vol. % P3 Bonding Elements Added Hardness (GPa) |
|---|---|---|
| Oxides | | |
| $Al_2O_3$ | 19.0-26.0 | 14-19 |
| BeO | 0.8-1.2 | 1.0-1.3 |
| MgO | 6.0-10.0 | 4.7-7.5 |
| $MgAl_2O_4$ | 14.0-18.0 | 10.0-13.0 |
| Mullite | 15 | 11.0 |
| $SiO_2$ (Quartz) | 12.0 (011) | 8.9 |
| $TiO_2$ | 9.0-10.0 | 6.8-7.5 |
| $ThO_2$ | 10 | 7.48 |
| $Y_2O_3$ | 7.0-9.0 | 5.4-6.8 |
| $Y_3Al_5O_{12}$ | 17.0-19.0 | 12.4-13.8 |
| ZnO | 1.3-3.3 | 1.4-2.8 |
| $ZrSiO_4$ | 15 | 11.0 |
| $ZrO_2$ (cubic) | 12.0-15.0 | 9.0-11.0 |
| $ZrO_2$ (Partially Stabilized) | 13 | 9.6 |
| Carbides, Borides, Nitrides and Silicides | | |
| AlN | 12 | 8.9 |
| $B_4C$ | 30.0-38.0 | 21-27 |
| SiC (hot pressed) | 26.0-36.0 | 19-26 |
| $Si_3N_4$ (hot pressed) | 17.0-30.0 | 12-21.5 |
| $TiB_2$ | 18.0-34.0 | 13-24 |
| TiC | 16.0-28.0 | 11.0-20.0 |
| $ZrB_2$ | 22 | 16.0 |
| Halides and Sulfides | | |
| $CaF_2$ | 1.8 | 1.7 |
| KCl | 0.12 | 0.56 |
| $MgF_2$ | 6 | 4.68 |
| $SrF_2$ | 1.4 | 1.46 |
| Glass and Glass Ceramics | | |
| Aluminosilicates (Corning 1720) | 6.6 | 5.1 |
| Borosilicates (Corning 7740) | 6.5 | 5.0 |
| Silica (Fused) | 6.0-9.0 | 4.7-6.8 |
| Soda lime silica glass | 5.5 | 4.3 |

Similarly, the bonding elements may be also employed to affect the thermal conductivity. Also, the bonding elements may be used to affect the thermal expansion. Exemplary embodiments of these variations are provided in Table 8.

TABLE 8

Summary of calculated thermal conductivity and thermal expansion of different composites made with P3 Bonding Elements [1-6]

| Materials | Pure | | 30 Vol. % P3 Bonding Element Added | |
|---|---|---|---|---|
| | Thermal Conductivity (W/m · k) | Thermal Expansion $10^{-6}/°$ c. | Thermal Conductivity (W/m · k) | Thermal Expansion $10^{-6}/°$ C. |
| Granite | 3.1 | 7.0-9.0 | 2.68 | 6-7.5 |
| Basalt | 1.4 | 6.0-8.0 | 1.49 | 5.0-7.0 |
| Limestone | 3.1 | 6 | 2.68 | 5.4 |
| Dolomite | 3.6 | 7.0-10.0 | 3.03 | 6.0-8.0 |
| Sandstone | 3.9 | 11.00-12.00 | 3.24 | 9.0-10.0 |
| Quarzite | 4.3 | 11.0-13.0 | 3.52 | 9.0-10.0 |
| Marble | 2.7 | 4.0-7.0 | 2.4 | 4.0-6.0 |
| Vermiculite | 0.06 | NA | 0.55 | NA |
| Cork | 0.07 | | 0.56 | |
| Wool | 0.04 | | 0.54 | |
| Perlite | 0.03 | | 0.53 | |
| Nano-aerogel[11] | 0.009-0.012 | | 0.51-0.52 | |
| Rice Hulls | 0.03-0.06 | | 0.53-0.55 | |
| Cotton | 0.03 | | 0.531 | |
| Diamond | 1000-2000 | | 700-1400 | |
| Cement Paste | | | | |
| w/c = 0.4 | 1.3 | 18.0-20.0 | 1.42 | 14.0-15.0 |
| w/c = 0.5 | 1.2 | 18.0-20.0 | 1.35 | 14.0-15.0 |
| w/c = 0.6 | 1 | 18.0-20.0 | 1.21 | 14.0-15.0 |
| Concrete | 1.5-3.5 | 7.4-13 | 1.5-3.0 | 6.0-10.0 |
| Water | 0.5 | — | 0.86 | — |
| Air | 0.03 | | 0.531 | — |
| Steel | 120 | 11.0-12.0 | 84.51 | 9.0-10.0 |
| AlN | 200.0-280.0 | 5.6 | 140.0-196.0 | 5.12 |
| BeO | 63.0-216.0 | 8.5-9.0 | 44.00-152.00 | 7.0-7.5 |
| MgO | 37 | 13.5 | 26.41 | 10.65 |
| $Si_3N_4$ | 25 | 3.1-3.7 | 18.01 | 3.4-3.8 |
| $TiB_2$ | 40 | 7.8 | 28.51 | 6.66 |

Tables 3-4 shows how compressive strength varies with core fiber size. As the mean size of core fibers was decreased from 70 to 9 microns, the compressive strength increased from 60 to as high as 300 MPa but stress versus displacement curves such as in FIG. 9 show that these materials undergo catastrophic brittle fracture (not graceful failure).

Figure 10:
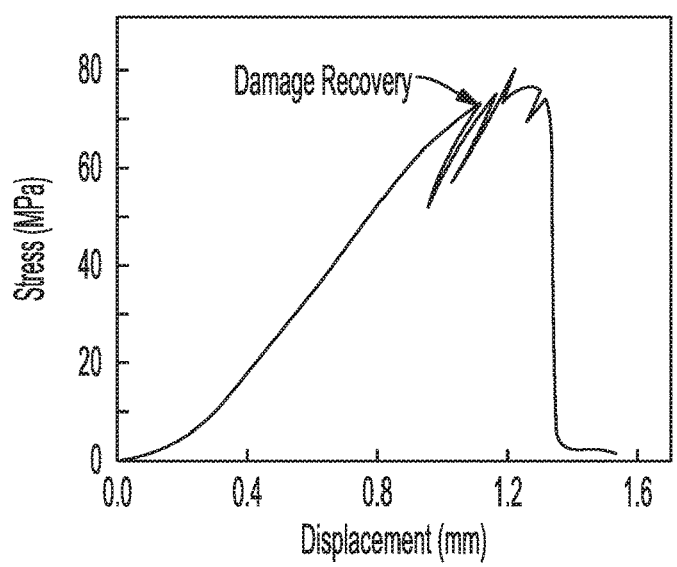
FIG. 10 shows a stress versus displacement curve of a FB4 composite material (see Table 3) in compression according to an exemplary embodiment of the present invention.
Figure 11A:
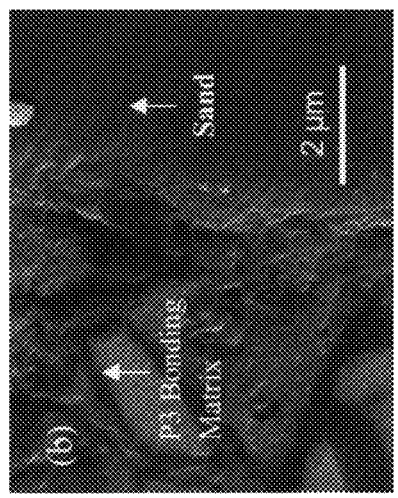
FIGS. 11(a)-11(d) show interaction of a P3 bonding matrix (also see Table 4) with FIG. 11(a) $SiO_2$ and FIG. 11(b) $SiO_2$, FIG. 11(c) high Ca Fly Ash (HCFA) and (d) $CaCO_3$ according to embodiments of the present invention. Observation of the P3 bonding matrix and $SiO_2$ interface (FIGS. 11(a) and (b)) reveals that $CaCO_3$ particles and silica rich coating around wollastonite core fibers have formed a interface with externally added silica particles.
Figure 11B:
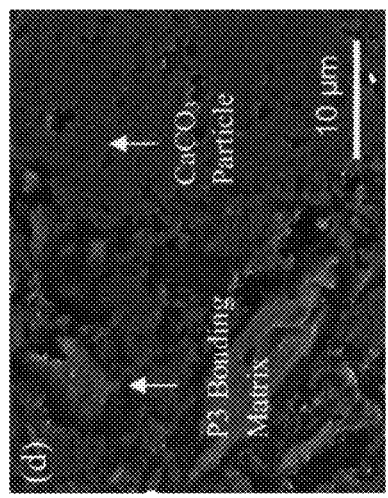
Figure 11C:
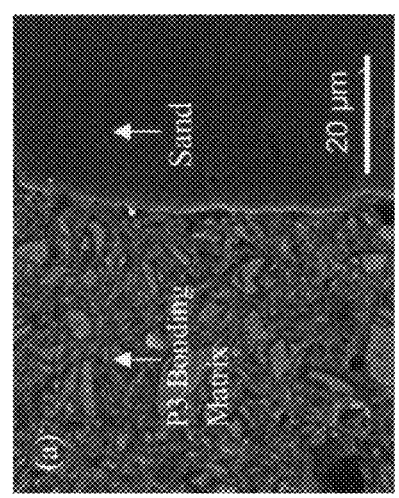
Figure 11D:
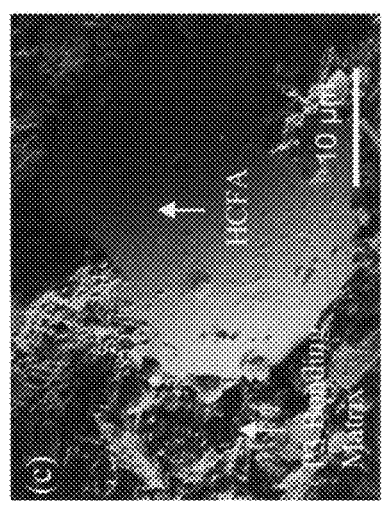

Composition FB4 is developed by using very large core fibers (~2800-150 μm) of different size fractions to impart damage tolerance. Initially during stress versus displacement measurement (FIG. 10), stress varied linearly with displacement. After reaching an ultimate compressive strength (UCS) of 72 MPa, stress dropped sharply due to failure, thereafter sample regained its original strength (a sign of damage tolerance or in other words, graceful failure or ductility or ductile failure); subsequently this cycle continued 3 times before failure. Thus, the interfacial structure played a major role in damage tolerance of this bonding matrix (FIG. 10). These kinds of structures will be referred as "Self Reinforced Cementitious Composites (SRCC)". In this case the novelty is that fiber-based bonding elements are acting as both cementitious units (active fibers or filler), as well as, they are also acting as crack deflectors for damage tolerance.

In summary, sizes of core fibers play a major role in controlling the mechanics of the bonding matrix. If mean particle size of core fibers are small (about <70 μm) then these bonding matrices showed large compressive strengths (as high as 300 MPa) with brittle rather than graceful fracture or failure. If large core fibers (~150-2800 μm) are used (composition FB4, Table 3) then crack deflection and debonding of these large active fiber interfaces play an important role in inducing damage tolerance (or ducility or graceful failure).

By controlling porosity in randomly oriented bonding matrix composed of wollastonite core fibers with mean particle size of 9 μm, a wide variety of structures can be created. Table 4 shows the effect of porosity on compressive strength of bonding matrix. The decrease in porosity from 45% to 17% in the bonding matrix caused an increase in compressive strength of the bonding matrix from 10 MPa to 163 MPa.

The above example shows how the properties of these materials can be changed. There are many microstructures where this bonding element may be used.

Example 2

FIGS. 11(a)-11(d) show interaction of $SiO_2$, high Ca Fly Ash (HCFA) and $CaCO_3$ with P3 bonding matrix (P3 composition, Table 4). Observation of the P3 bonding matrix and $SiO_2$ interface (FIGS. 11(a) and (b)) reveals that $CaCO_3$ particles and silica-rich coating around wollastonite core fibers have formed a bonded interface with externally added silica particles. In P3 bonding matrix-HCFA interface there was no sign of debonding between the HFCA and bonding matrix (FIG. 11(b)). Similarly in P3 bonding matrix-$CaCO_3$ interface, externally added $CaCO_3$ particles have formed diffuse interfaces with bonding elements.

Figure 12A:
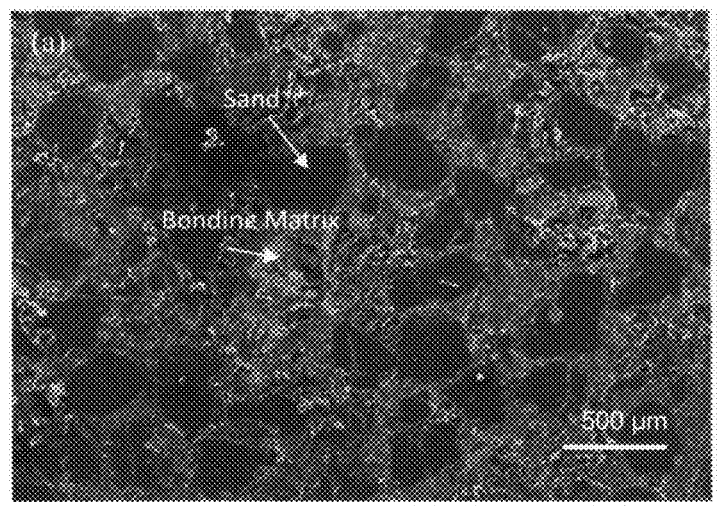
FIGS. 12(a)-12(b) illustrate the failure behavior of a 0-3 composite material according to an embodiment of the present invention.
Figure 12B:
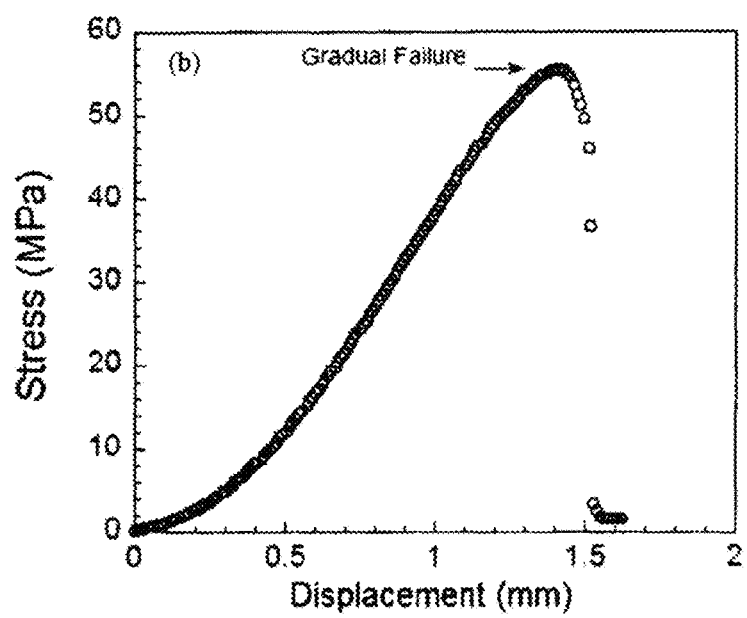
Figure 13A:
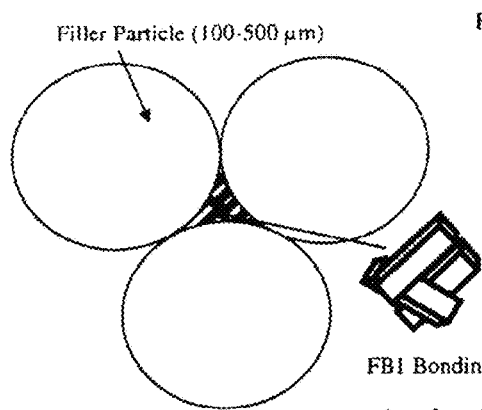
FIGS. 13(a)-13(d) illustrate exemplary embodiments of the present invention having different levels of repeating hierarchic structures.
Figure 13B:
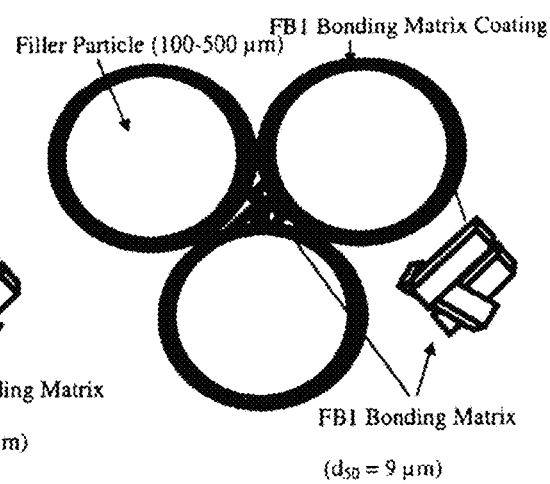
Figure 13C:
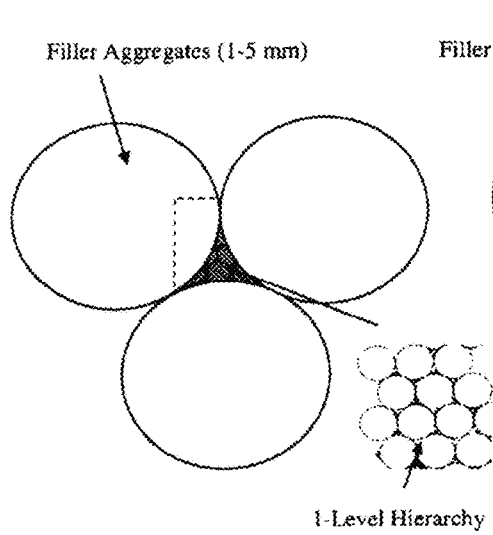
Figure 13D:
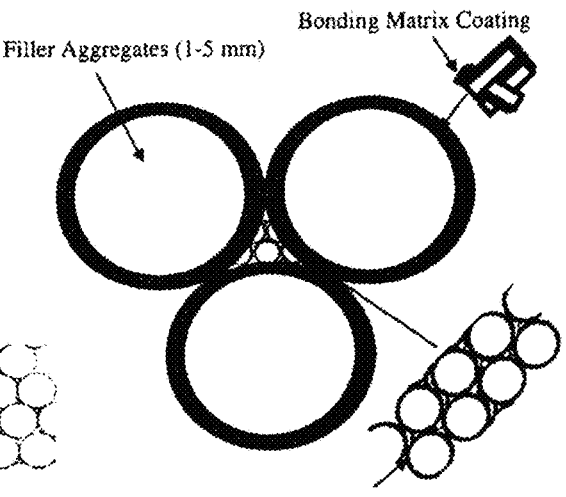

FIG. 12(a) shows a typical example of 0-3 composite, where 70 vol. % sand (silica) particulate components are dispersed in P3 bonding matrix with porosities in the structure (Table 4). This composite material showed a gradual failure during compression, and had a compressive strength of ≈55 MPa (FIG. 12(b)). 30 vol. % P3 bonding matrix is acting as the hydrate free cementing phase in the composite material by binding to itself as well as to sand particles.

FIGS. 14 (a) and (b) show optical micrographs of a composite material formed by using a volumetric ratio of 1:2:2 of FB1 Fiber Cores, (300-500) μm sand, and (2-4) mm sand aggregates, respectively. At higher magnifications, it can be seen that bonding matrix is in the void spaces of sand particles, and a thick layer of bonding matrix has surrounded sand particles to act as a cementing phase also. Table 9 shows certified ASTM property testing by CTL, Illinois and the mechanical properties of the present microstructures in one embodiment. These values should not be viewed as limiting but only as exemplary. For example, additional embodiments my include composite materials with an abrasion resistance having an average wear of less than 1.00 mm using ASTM C 944 instead of having to be exactly 0.38 mm. This composite material has mechanical properties like High Performance Concrete, and in this particular case 20 vol. % of bonding matrix was used to bond the entire structure.

TABLE 9

ASTM certification of a typical Hydrate Free Concrete (HFC4) by CTL (Construction Technology Laboratory, Skokie, Illinois)

| Physical Properties | ASTM | Hydrate Free Concrete | FHWA HPC Grade[5] |
|---|---|---|---|
| Compressive Strength (psi) | C 39 | 6720 ± 95 | Grade 1 |
| Modulus of Elasticity (psi) | C 469 | $4.040 \times 10^6$ | Grade 1 |
| Split Tensile (psi) | C 496 | 390 ± 10 | Not available |
| Chloride Permeability (Coulombs) | C 1202 | 1565 ± 56 | Grade 1 |

TABLE 9-continued

ASTM certification of a typical Hydrate Free Concrete (HFC4)
by CTL (Construction Technology Laboratory, Skokie, Illinois)

| Physical Properties | ASTM | Hydrate Free Concrete | FHWA HPC Grade[5] |
|---|---|---|---|
| Abrasion Resistance | C 944 | 0.38 mm average wear | Grade 3 |
| Freeze and Thaw (Number of Cycles) | C 666 | 300 cycles (45-50% strength): DF = 10 | Less than Grade 1 |
| Scaling Resistance | C 672 | x < 1 | Grade 3 |
| Shrinkage | C 157 | Negligible | Grade 3 |

[5]http://www.fhwa.dot.gov/BRIDGE/HPCdef.htm.

Example 3

Figure 16:
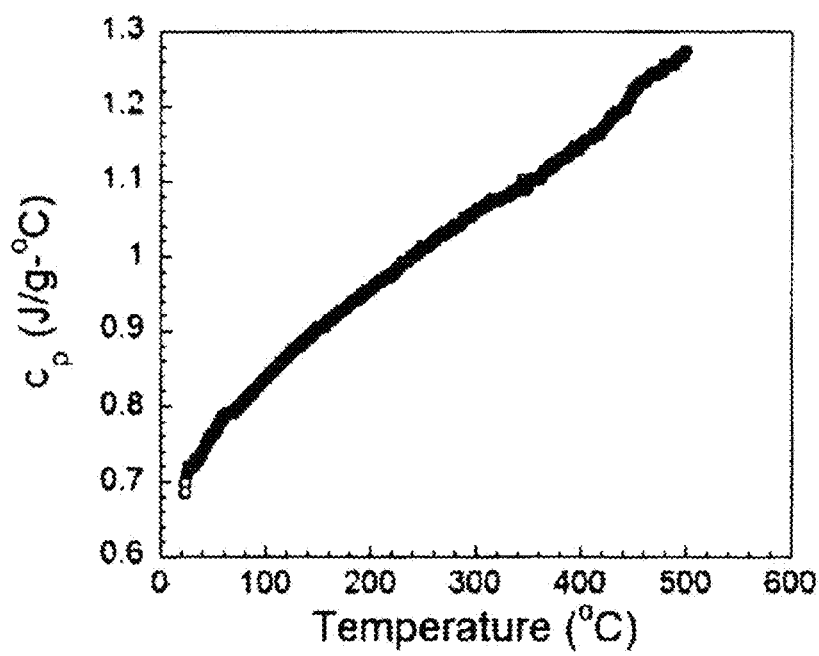
FIG. 16 shows a plot of specific heat ($c_p$) of P3 (Table 4) as a function of temperature. Experiment performed according to ASTM E1269.

FIGS. 15(a)-15(b) shows the variation of thermal strain of FB1B from −40 to 100° C. during thermal cycling for 2 consecutive cycles. No signs of thermal hysteresis, or phase changes were observed during thermal cycling. Table 10 summarizes thermal properties of P2 and P3 compositions. FIG. 16 shows variation of specific heat from RT to 500° C. of P3 (Table 4). Specific heat increased gradually from 0.711 (J/g$^2$C) to 1.274 (J/g-° C.). No phase change or change in thermal properties of the P3 composition was observed. Clearly, similar types of bonding elements in their pure form, or incorporated into composite composition can be used in high temperature applications like fire resistance etc.

TABLE 10

Summary of thermal properties of
P2 and P3 compositions (Table 3)

| Physical Properties | P3 | P2 |
|---|---|---|
| Thermal Conductivity (W/m · k) | 1.7 (RT) 1.9 (250° C.) | 1.0 (RT) 1.6 (250° C.) |
| Specific Heat (J/g ° C.) | 0.7 | NA |
| Thermal Expansion ($10^{-6}$/° C.) | 4.0 | NA |

By using Table 10, thermal conductivity and thermal expansion of different composite materials by using bonding elements and using a simple rule of mixtures approximation can be calculated. For example, a composite material of 30 vol. % P3 bonding matrix with cork will have a calculated thermal conductivity of 0.55 W/m·K. Similarly, a composite material of 30 vol. % P3 bonding matrix with AlN can have thermal conductivity between 146-196 W/m·k. Moreover, these values can be further regulated by varying the content and porosity of the bonding elements. For example, it is also possible to use 10 vol. % porous P2 matrixes to bind perlite and have thermal conductivity as low as 0.13 W/m·K. In brief, there are numerous combinations and permutations which can be used to tailor thermal properties.

Preliminary results also showed that FB1A samples were able to withstand 10 cycles of thermal shock from 200° C. and then quenching them in water.

Example 4

Properties like blended cements, high strength mortars, and stones like Granite, Sandstone, and Terracotta.

Wollastonite based bonding matrices (Tables 3 and 4) have the appearance of marble or limestone. It can be used as an architectural construction material in a pristine form for decorative purposes. It is also possible to tailor the appearance by adding different colorant additives (Table 11). FIGS. 17(a)-17(c) shows typical examples of sandstone, granite, and terracotta mimics prepared by adding colorants in the bonding matrix. CPC composition series (Table 12) was used to prepare different sandstone mimics. Since bonding elements are blended with sand so these composition materials can be used as substitutes for mortar, grouts, or high strength structural bricks also. Similarly, by adding different colors in bonding matrix (Tables 3 and 4) different types of colors and textures can be generated. In such manner, the composite material may be made to exhibit color and texture resembling natural stones described herein. Alternatively, the composite material may be made to exhibit color and texture resembling architectural concrete described herein. Table 13 summarizes physical properties of different stones. Except Quarzite and Granite, compressive strengths of the all the listed solids are less than 69 MPa. Average compressive strength of all the different composite materials of the CPC series is greater than 69 MPa (Table 12). Moreover, average compressive strengths of FB1A and FB1B compositions (bonding matrix without any additives, Table 3 and previous discussion) are between 147-300 MPa. Clearly, physical properties of geomimetic ceramic materials are better than natural stone. By using the concept explained earlier it is also possible to mimic other natural rocks like travertine, serpentine, etc.

TABLE 11

Different types of colorants

| Color | Pigment |
|---|---|
| Red | Iron oxide (hematite) |
| Yellow | Iron Oxide |
| Green | Chromium Oxide |
| Blue | Cobalt Oxide |
| Black | Carbon, Iron oxide (magnetite) |
| Brown | Iron Oxide |

TABLE 12

Summary of compositions of different blends

| Composition | Wollastonite Fiber Core[‡] $d_{50}$ = 9 μm | Masonary Sand (300-500 μm)[‡] | $CaCO_3$ (<40 μm)[‡] | Sieved Sand (500-800 mm)[‡] | Sieved Sand (800-1400 μm)[‡] | Compressive Strength (MPa) | Flexural Strength (MPa) |
|---|---|---|---|---|---|---|---|
| FB1B | 100 | — | — | — | — | 147 ± 24 | 26 ± 5 |
| BC1 | 48 | — | 52 | — | — | — | 21 ± 2 |
| CPC1 | 50 | 50 | — | — | — | 100 ± 11 | 20 ± 1.5 |
| CPC2 | 33 | 67 | — | — | — | 87 ± 1 | 14.4 ± 1.5 |
| CPC3 | 33 | — | — | 67 | — | 89 ± 5 | 22 ± 5.5 |

TABLE 12-continued

Summary of compositions of different blends

| Composition | Wollastonite Fiber Core[‡] $d_{50}$ = 9 μm | Masonary Sand (300-500 μm)[‡] | $CaCO_3$ (<40 μm)[‡] | Sieved Sand (500-800 mm)[‡] | Sieved Sand (800-1400 μm)[‡] | Compressive Strength (MPa) | Flexural Strength (MPa) |
|---|---|---|---|---|---|---|---|
| CPC4* | 50 | — | — | 50 | — | 103 ± 4 | |
| CPC5 | 33 | — | — | — | 67 | 68 ± 9 | |

[‡]All compositions are in vol %
*Certified by CTL (Skokie, IL)

TABLE 13

Physical properties of different stones

| Stone | ASTM | Compressive Strength (MPa) | Flexural Strength (MPa) | Absorption (wt. %) | Density (g/c.c) |
|---|---|---|---|---|---|
| Traventine | C1527-3 | 52 | 6.9 | 2.5 | 2.3 |
| Serpentine | C1526-08 | 69 | 6.9 | 0.2 | 2.56 |
| Marble | C503-08 | 52 | 7 | 0.2 | 2.6-2.8 |
| Limestone | C568-08 | (12-55) | 2.9-7 | (3-12) | 1.76-2.56 |
| Sandstone | C 616-08 | 27.6 | 2.4 | 8 | 2 |
| Quarzite Sandstone | C 616-08 | 68.9 | 6.9 | 3 | 2.4 |
| Quartzite | | 138 | 13.9 | 1 | 2.56 |
| Granite | C 615-03 | 131 | 10.34 | 0.4 | 2.56 |

Furthermore, it is also possible to fabricate structures with low water absorption also. For example, CPC2 (Table 12) has a water absorption of 5 wt. %. It is already comparable to sandstone (Table 14). By adding 1 wt. % fumed silica ($d_{50}$<1 μm) in CPC2 type compositions, the water absorption can be further reduced to 2.6 wt. %.

TABLE 15

Compressive strength of different compositions of hydrate free concrete

| Composition | Wollastonite Fiber Cores[‡] | Sieved Sand (200-500) μm[‡] | River Gravel (¼")[‡] | Silica Aggregate (2-4 mm)[‡] | Compressive Strength (MPa) |
|---|---|---|---|---|---|
| HFC1* | 1 | 2 | 1 | — | 42 ± 4 |
| HFC2 | 1 | 2 | 2 | — | 26 |
| HFC3 | 1 | 2 | 4 | — | 14 |
| HFC4* | 1 | 2 | — | 2 | 47 ± 1 |
| HFC5 | 1 | 2 | — | 4 | 31 |

[‡]All compositions are in vol %
*Certified by CTL (Skokie, IL)

The initial composition here is described as the "composite" rather than describing the final composition. The exact final product in terms of chemical and phase composition is unknown. On the other hand, the initial composition can be precisely specified. This is true for all the described examples, not just this one.

TABLE 14

Compressive strengths of high strength hydrate free concretes
(Certified by CTL)

| Composition | Wollastonite[‡] ($d_{50}$ = 9) | Sieved Sand[‡] 300-500 μm | Sieved Sand[‡] 500-800 μm | Basalt[‡] (6-8 mm) | Dolostone[‡] (2-4 mm) | Silica Aggregates[‡] (2-4 mm) | Compressive Strength (MPa)* | Water Absorption ASTM C67 (wt %) |
|---|---|---|---|---|---|---|---|---|
| HFC4 | 20 | 40 | — | — | — | 40 | 47 ± 1 | 8.3 ± 1.0 |
| HSHFC1 | 21 | — | 42 | 37 | — | — | 80 ± 8 | 3.1 ± 0.9 |
| HSHFC2 | 15 | — | 30 | 55 | — | — | 65 ± 5 | 4.7 ± 0.6 |
| HSHFC3 | 20 | — | 41 | — | 39 | — | 82 ± 7 | — |

[‡]All compositions are in vol %
*Certified by CTL (Skokie, IL)

Density of Basalt=2.9 g/c·c, density of wollastonite=2.9 g/c·c, density of dolosone=2.7 g/c·c, density of sand=2.6 g/c·c, density of $CaCO_3$=2.7 g/c·c, density of steel=7.8 g/c·c, density of gravel=2.6 g/c·c Comparison of Structural Concrete with HFC.

Structural concrete has a compressive strength of 35 MPa. By making a composite material of wollastonite core fibers with sand and different types of aggregates, it is possible to attain a wide variety of strengths which are comparable to structural concrete. Table 15 shows few simple compositions of hydrate free concrete (HFC), which showed similar strength to that of structural concrete and therefore suitable in all applications of structural concrete.

Comparison of High Strength and Performance HFC with HSC (High Strength Concrete) and High Performance Concrete (HPC)

As discussed in an earlier example, the HFC4 composite material performs like high performance concrete in mechanical strength (Table 9). In addition, it has also Cl permeability like Grade 1 HPC. Interestingly, HFC4 have high abrasion resistance, scaling resistance and shrinkage like Grade 3 High Performance Concrete. It is interesting to note that even without addition of air entraining mixtures, HFC4 survived 300 freeze-thaw cycles as specified by ASTM C666, however, it's DF (Durability Factor) decreased to 10. Modifications to the sand and aggregate components of the concrete formulations can increase this Durability Factor to 93 after 163 cycles by ASTM C666.

By using advanced processing methods, better packing can be achieved in HFC composite materials (Table 14). For example, water absorption decreased from 8.3 wt % in HFC4 to 3.1 and 4.7 wt % in HSHFC1 and HSHFC2. As expected, compressive strength also increased in these composite materials. HFC4 showed a compressive strength of 47 MPa while the compressive strengths of HSHFC1 and HSHFC2 increased to 80 MPa and 65 MPa, respectively.

Early Strength Cement or Concrete

Figure 18:
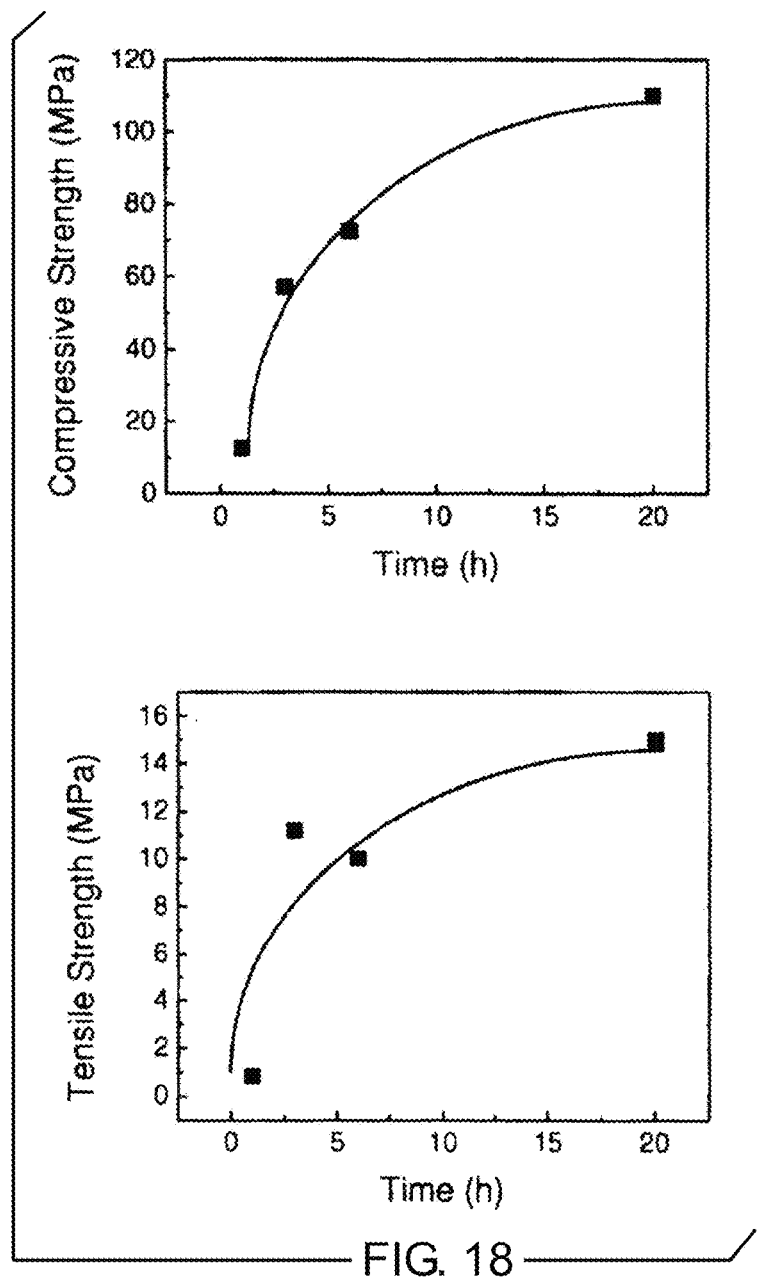
FIG. 18 shows the effect of reaction time on, compressive, and tensile strength of the bonding matrix (104° C. and ≈300 psi $CO_2$ initial starting pressure). P3 Bonding matrix is formed after 20 h reaction (Table 4).

FIG. 18 shows variation of reaction time on mechanical strength. After a reaction time of 5 h, a compressive strength of 60 MPa is reached. These systems can be used to prepare early strength cementing phase, or as concretes in composite systems. Portland cement concrete does not do this in such short a time.

Comparison of Engineered HFC Compositions with UHPC (Ultra High Performance Concrete)

Figure 19A:
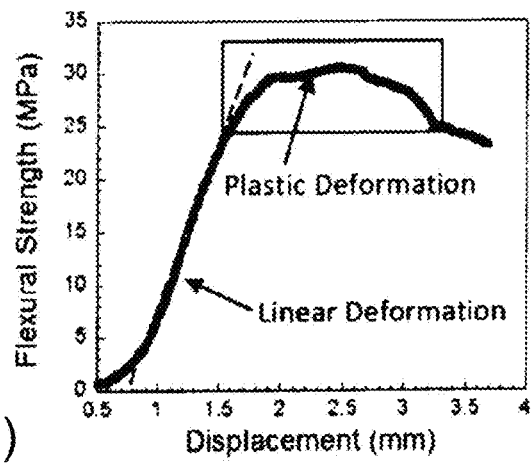
FIGS. 19(a)-19(c) show plots of flexural strength versus displacement of FIG. 19(a) FB1B bonding matrix with metal fibers according to an embodiment of the present invention, FIG. 19(b) pristine CPC2 matrix (Curve A) according to an embodiment of the present invention, and CPC2 with 10 wt % metal fibers (curve C, composition FRCPC2, Table 16) and with 2.5 wt % PVA fibers (Curve B) according to embodiments of the present invention, and FIG. 19(c) comparison of the flexural strength of FB1B bonding matrix with 10 wt % as received and oxidized (rusted) metal fibers (compositions FRCPC2 and RFRCPC2, Table 16).
Figure 19B:
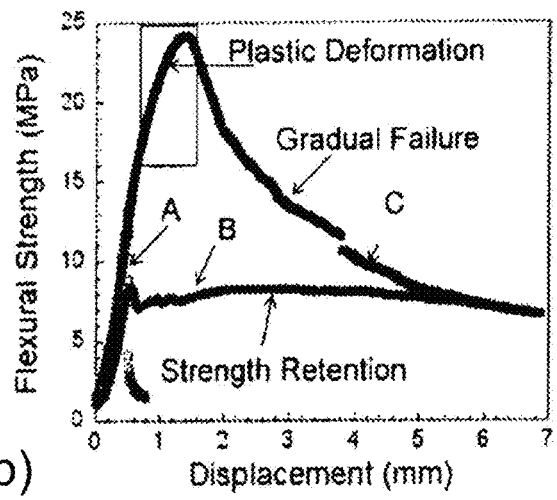
Figure 19C:
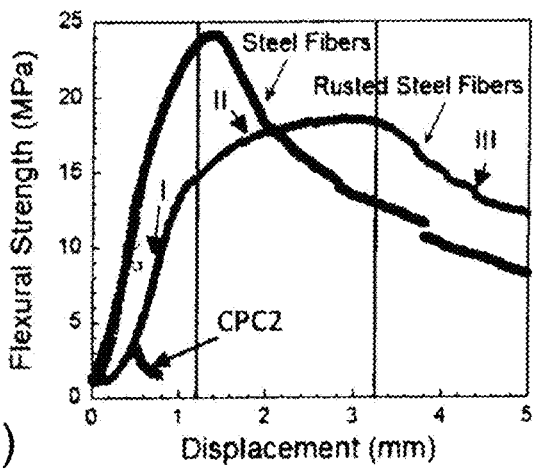
Figure 20A:
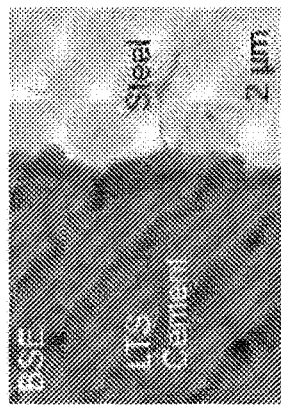
FIGS. 20(a)-20(f) shows in FIG. 20(a) SE and FIG. 20(b) BSE images of interface of steel fibers a bonding matrix according to an embodiment of the present invention, and EDS chemical mapping of FIG. 20(c) Ca, FIG. 20(d) Si, FIG. 20(e) Fe, and FIG. 20(f) O.
Figure 20B:
Figure 20C:
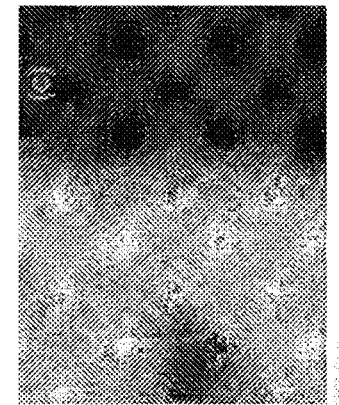
Figure 20D:
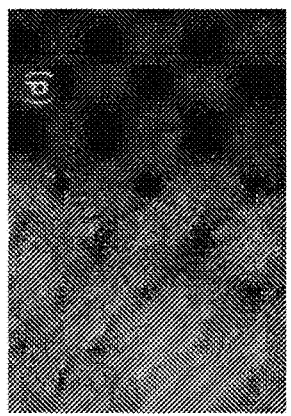
Figure 20E:
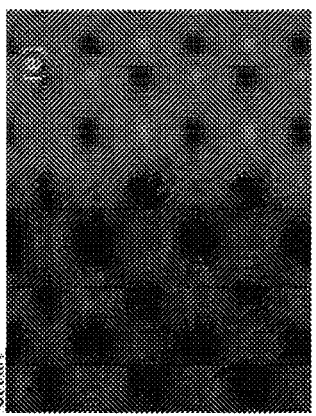
Figure 20F:
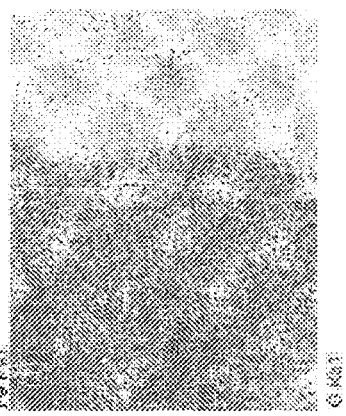

FIGS. 19(a)-19(c) shows typical ductile failure of FB1B bonding matrix reinforced with 10 wt. % DRAMIX steel fibers (ZP305, Bekaert Corporation, Marietta, Ga.). DRAMIX is a proprietary cold drawn low C steel fiber having length ≈30 mm and diameter ≈0.5 mm with hooked ends glued together. However, it is expected that similar results may be achieved with various other steel fibers.

CPC2 type composition (Table 12) was also infiltrated with 10 wt. % (4 vol. %) steel fibers (FRCPC2, Table 16). These compositions showed nearly 1.4 times higher flexural strength than the CPC composition and simultaneously ductile failure also (FIG. 19(b)). Similarly, when CPC2 was infiltrated with 2.5 wt. % PVA fibers (RFS400, NYCON PVA, 18 mm fibers, Fairless Hills, Pa.), then they failed at a lower strength, but showed enhanced strength retention.

air (rust formation). Subsequently, 10 wt. % (4 vol. %) rusted fibers were also put in CPC2 matrix (RFRCPC2, Table 16). Due to enhanced debonding at the interface, these new compositions showed enhanced ductility (region II in FIG. 19(c)). FIGS. 20(a)-20(f) show the steel-bonding matrix interface. Clearly, during the curing reaction the original interface has interacted with the steel surface. These composite materials are referred to as "hydrothermally controlled interfacial engineered ductile composites".

It is believed that the interface of the steel fiber may have a unique composition and structure.

Table 17 shows comparison of properties of Ductal® (A propriety ultra high performance concrete developed by Lafarge (US/Canada Region, Calgary, Alberta, Canada, T2W 4Y1) with FB1B (a wollastonite core fiber based bonding matrix, Table 2B). FB1B has higher compressive and flexural strength as compared to Ductal®-FO (without thermal treatment), but slightly lower compressive and flexural strength as compared to Ductal®-FM or Ductal®-AF (Ductal®-FM with thermal treatment). The thermal expansion of FB1B is higher than all the different varieties of Ductal®. FB1B has brittle failure. By using steel fibers and further engineering of particles and fibers, it is possible to fabricate composite materials with ultra high performance. These materials can be potentially used in all applications of

TABLE 16

Summary of different compositions fabricated by modifying CPC2

| Composition | Wollastonite‡ $d_{50}$ = 9 μm | Masonary sand‡ (300-500) μm | Wollastonite‡ (NYCOR 100) $d_{50}$ = 800 μm | Steel Wire Fibers‡ (Dramix) As received | Rusted | Flexural Strength (MPa) |
|---|---|---|---|---|---|---|
| CPC2 | 33 | 67 | — | — | — | 14.4 ± 1.5 |
| SRCPC2 | 22 | 46 | 31 | — | — | 16.2 ± 1.3 |
| FRCPC2 | 32 | 64 | — | 4 | — | 20.0 ± 3.5 |
| RFRCPC2 | 32 | 64 | — | — | 4 | 18.1 ± 2.9 |

All compositions are in vol %

In order to tailor and enhance the interaction of bonding elements with steel, these fibers were allowed to oxidize in ultra high performance concrete materials, which will be discussed in the following section.

TABLE 17

Comparison of properties of wollastonite core fiber based bonding matrix with Ductal ® (A type of Ultra high performance concrete)

| Material | Flexural Strength (MPa) | Compressive Strength (MPa) | Elastic Modulus (GPa) | Coefficient of Thermal Expansion (/° C.) |
|---|---|---|---|---|
| Ductal ®-FM or Ductal ®-AF With Thermal Treatment (FM is metal fibers) | 30-40 | 150-180 | 50 | $11.8 \times 10^{-6}$ |
| Ductal ®-FO Without Thermal Treatment (FO—Organic Fibers) | 15-20 | 100-140 | 45 | $11.8 \times 10^{-6}$ |
| Wollastonite core fiber based bonding matrix (FB1B - Table 4) | 26 ± 5 | 147 ± 24 | 32 | $7.4 \times 10^{-6}$ (−40° C.-100° C.) |
| Wollastonite core fiber based bonding matrix (FB1B - Table 4) with 10 wt. % fibers | 25-30 | NA | NA | NA |

TABLE 17-continued

Comparison of properties of wollastonite core fiber based bonding matrix with Ductal ® (A type of Ultra high performance concrete)

| Material | Flexural Strength (MPa) | Compressive Strength (MPa) | Elastic Modulus (GPa) | Coefficient of Thermal Expansion (/° C.) |
|---|---|---|---|---|
| CPC2 with 10 wt. % metal fibers (FRCPC2) | 18-25 | NA | NA | NA |

Novel Ductile and Impact Resistant Structures

Figure 21:
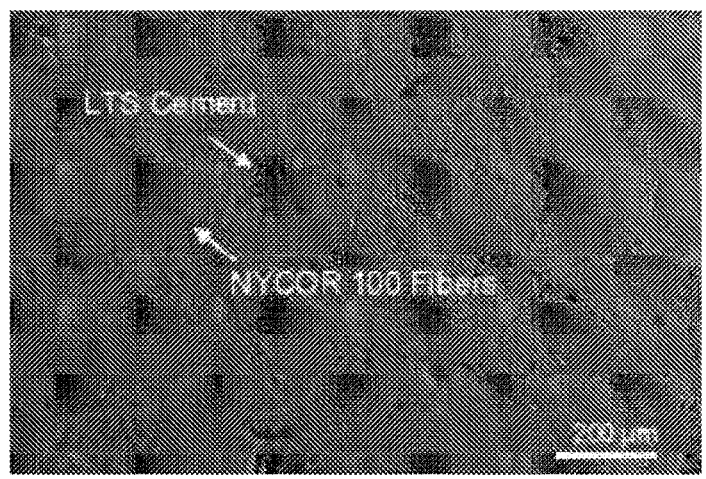
FIG. 21 shows SE FESEM microstructure of SRC3 composite material (also see Table 18) according to an embodiment of the present invention.

Table 18 summarizes different composite materials fabricated by using longer wollastonite fiber cores ($d_{50}$=800 µm). FIG. 21 shows a typical microstructure of SRC3 composite materials (Table 18). As the concentration of longer fibers are increased in these self reinforced structures, flexural strength decreases, however, as summarized in Table 20 impact resistance improves further. For example, pristine FB1B bonding matrix fails at 0.75 ft·lb impact, whereas, when they are self-reinforced with longer fiber cores, they fail at 4.5 ft·lb impact. Traditional monolithic materials like Granite, Travertine, Marble fail at 1.2 ft. lb, whereas, Metro-Dade approved Pittsburgh Corning Thickset 90 (Pittsburgh Corning Corporation, Pittsburgh, Pa.) fails at 2.2 ft·lb impact. It is clear that SRCC has one of the highest impact resistances among different types of construction materials.

TABLE 18

Summary of compositions of self reinforced composites

| Composition | Wollastonite‡ (NYAD 400) $d_{50}$ = 9 µm | Wollastonite‡ (NYAD M200) $d_{50}$ = 15 µm | Wollastonite‡ (NYCOR 100) $d_{50}$ = 800 µm | Flexural Strength (MPa) |
|---|---|---|---|---|
| FB1B | 100 | — | — | 26 ± 5 |
| SRC1 | 80 | — | 20 | ≈23 |
| SRC2 | 50 | — | 50 | ≈18.5 |
| SRC3 | 14 | 29 | 57 | 17.5 ± 0.5 |

‡All compositions are in vol %

Super-Blends

Figure 22:
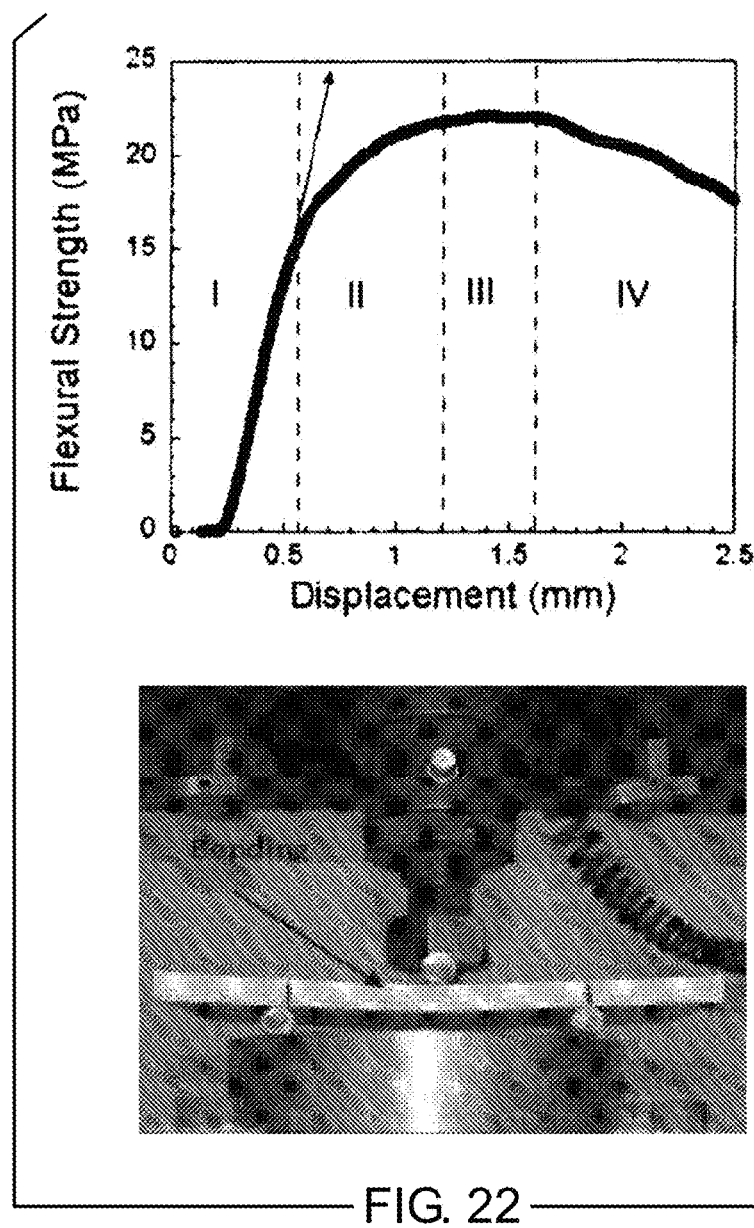
FIG. 22 shows a plot of flexural stress versus displacement of a FSRBC1 composite material (also see Table 19), and a digital photograph, showing bending of the FSRBC1 composite material during testing in an INSTRON system.

In earlier examples, concepts of "Self Reinforced Cementitous Composites (SRCC)" and Hydrothermally Controlled Interfacially Engineered Ductile Composites" were explained. It is possible to integrate these two approaches and fabricate a new class of materials called Super-blends (Table 19). FIG. 22 shows ductile behavior of FSRBC1 composite material. Four main regions were observed during deformation: (I) Elastic, (II) Plastic, (III) Strength retention, and (IV) Gradual failure. FIG. 22 shows bending of this composite material during 3-point bending. These solids have high impact resistance (Table 20). For example, FSRBC1 has an impact resistance of 13 ft·lb, which is about 6 times higher than that for Pittsburgh-Corning Thickset 90.

TABLE 19

Different compositions used for fabricating super blends

| Composition | Wollastonite Fiber Core‡ $d_{50}$ = 9 µm | CaCO₃‡ (<30 µm) | Dolomite‡ (Dolocron 4213) | Wollastonite‡ (NYCOR 100) $d_{50}$ = 800 µm | Steel Wire Fibers‡ (Dramix) | Flexural Strength (MPa) |
|---|---|---|---|---|---|---|
| BC1 | 38 | 62 | — | — | — | 21 ± 2 |
| SRBC1 | 32 | 52 | — | '16 | — | 14 ± 4 |
| FSRBC1 | 37 | 40 | — | 19 | 4 | 22 ± 4 |
| DC1 | 34 | — | 66 | — | — | 9.7 ± 1.6 |
| SRDC1 | 40 | — | 40 | 20 | — | 18.7 ± 1.7 |
| FSRDC1 | 38 | — | 39 | 19 | 4 | 20.9 ± 2.7 |

‡All compositions are in vol %

TABLE 20

Impact resistance of different compositions by using ball impact (Certified by Trinity/ERD, Columbia, SC)

| | FPS Units | | | | |
|---|---|---|---|---|---|
| Material Systems | m (lbs) | v (ft/s) | KE (ft. lb) | p (lb. ft/s) | h (ft) |
| FSRBC1, FRCPC2* | 2.3 | 19 | 13 | 44 | 6 |
| SRC3 (F) | 1.2 | 15.5 | 4.5 | 18.6 | 3.2 |
| SRC3 (P) | 0.75 | 20.4 | 4.9 | 15.3 | 6.5 |
| Pittsburgh Corning Thickset 90 (F) | 1.2 | 11.0 | 2.2 | 13.1 | 1.6 |
| SRC 1 (F) | 0.75 | 15.5 | 2.8 | 11.6 | 3.25 |
| Pittsburgh Corning Thickset 90 (P), Marble (F), Traventine (F), Granite (F) | 1.2 | 8 | 1.2 | 9.6 | 1 |
| SRC1 (P) | 0.75 | 10.9 | 1.4 | 8.2 | 1.6 |
| FB1B (F) | 0.75 | 8.0 | 0.75 | 6.0 | 1 |
| FB1B (P) | 0.75 | 5.7 | 0.4 | 4.3 | 0.5 |
| FB1B (P) | 0.75 | 4.0 | 0.2 | 3.0 | 0.25 |

*Internal testing
F—Fail,
P—Pass

These types of solids can be used for applications requiring properties of blast and impact resistant, ultra high performance and high performance concrete like properties, damage resistant applications like high freeze-thaw, adverse environment applications. Moreover, it is further possible to substitute the blend with different types of additives according to specialized applications like sulfate resistance, chloride resistance etc., but not limited to these. Table 19 shows an example where dolomite fillers can be used also instead of $CaCO_3$ or sand.

Example 5

Novel Chemistries of Bonding Elements

Figure 23A:
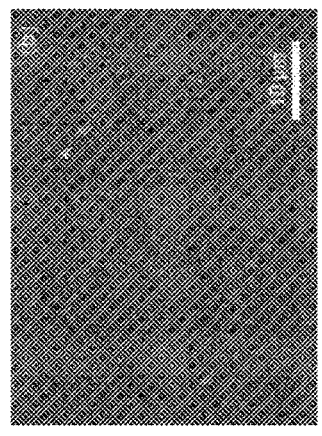
FIGS. 23(a)-23(e) show FESEM, in FIG. 23(a) SE and FIG. 23(b) BSE images of the microstructure of carbonated olivine according to an embodiment of the present invention, and at higher magnifications, FIG. 23(c) BSE, FIG. 23(d) SE, and FIG. 23(e) BSE images of carbonated olivine particles of different morphologies.
Figure 23C:
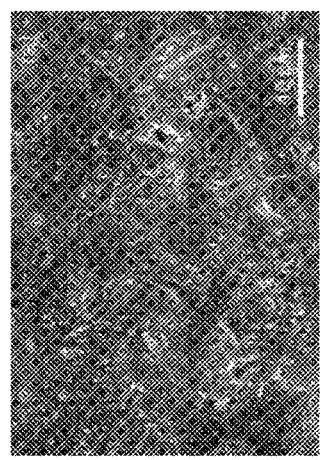
Figure 23B:
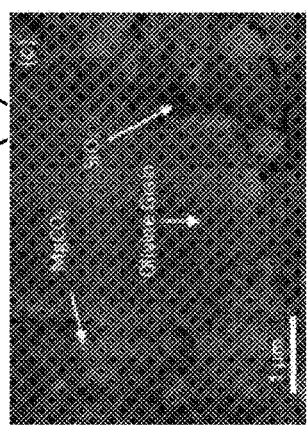
Figure 23E:
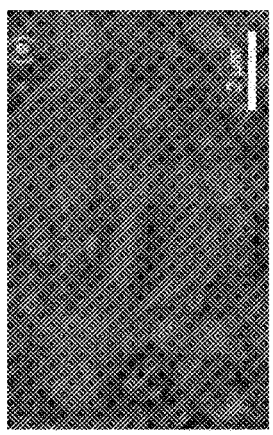
Figure 23D:
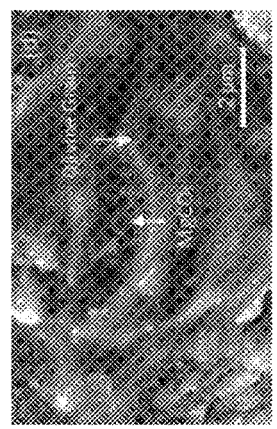
Figure 24A:
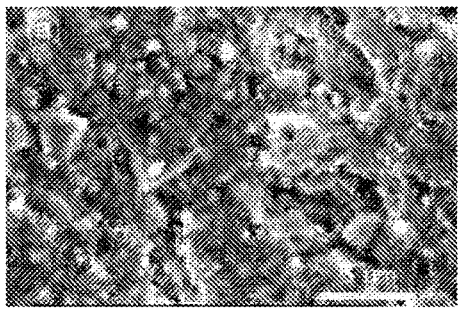
FIGS. 24(a)-24(d) shows FESEM, in FIG. 24(a) SE and FIG. 24(b) BSE images of the microstructure of carbonated diopside according to an embodiment of the present invention, and at higher magnifications, FIG. 24(c) SE and, FIG. 24(d) BSE images of carbonated diopside particles.
Figure 24B:
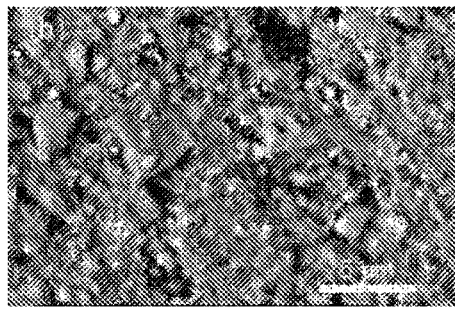
Figure 24C:
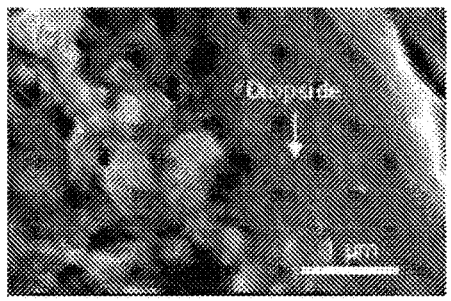
Figure 24D:
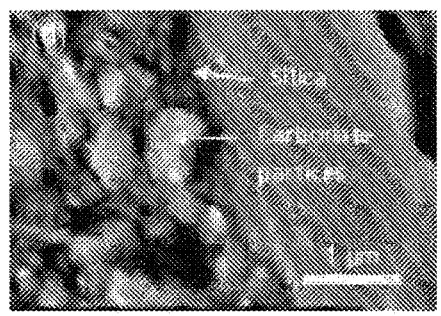
Figure 25:
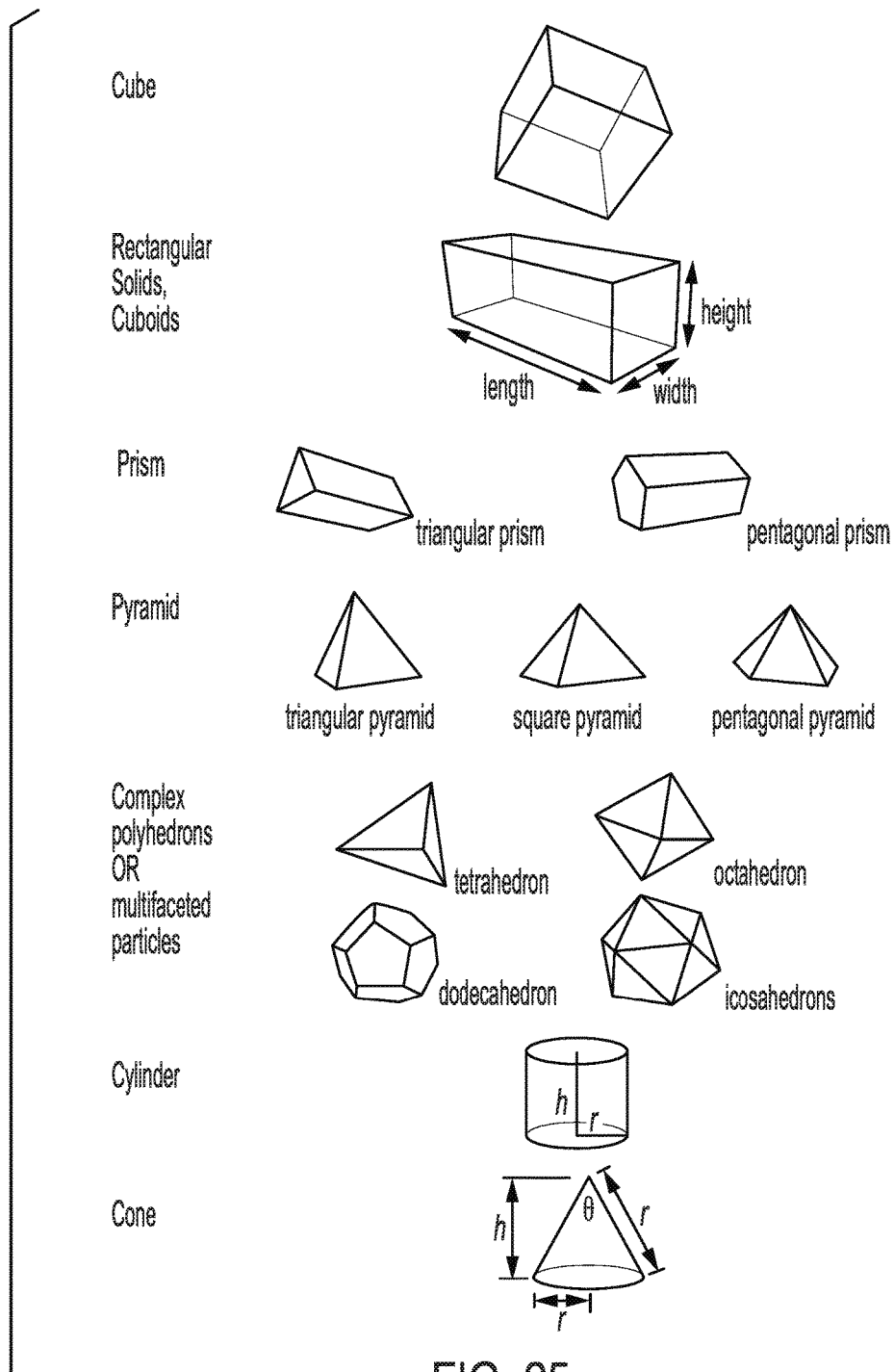
FIG. 25 shows the polyhedrons presented in Table 1.

Similarly, it is also possible to design a wide range of structures by using chemistries different from wollastonite above but have the common ability to use the disproportionation reaction to form the novel bonding element described in this invention. For example, FIGS. 23(a)-23(e) and FIGS. 24(a)-24(d) show microstructures of bonding matrices derived from olivine ($Mg_2SiO_4$) and diopside ($MgCaSi_2O_6$) precursors. These bonding matrices have a compressive strength of 162±15 MPa and ~93 MPa, respectively. For example, Olivine is composed of unreacted $Mg_2SiO_4$ core surrounded by unreacted silica layers (depleted zone) and $MgCO_3$ crystals acting as a cementing phase to bind the entire structure (FIG. 23(c)). These unreacted cores can have different morphologies, for example, FIG. 23(d) shows how $MgCO_3$ crystals precipitated inside cup-shaped Olivine grains.

FIGS. 24(a)-24(d) show microstructures of diopside grains as cores. These grains are surrounded by amorphous silica, and dolomite ($CaCO_3.MgCO_3$) and/or magnesite ($MgCO_3$) and/or $CaCO_3$ particles. As with wollastonite, these materials can be used to make novel microstructures via the various methods described earlier. Furthermore, as mentioned earlier, there is a huge number of ceramics that can undergo this disproportionation reaction, which are both minerals and waste products.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A composite material comprising:
    a bonding matrix, and
    a filler material incorporated in the bonding matrix, the bonding matrix comprising a plurality of bonding elements, each bonding element comprising:
        a core, wherein the core has a first chemical composition that includes one or more chemical elements;
        a first layer at least partially covering a peripheral portion of the core, wherein the first layer has a second chemical composition that is a different chemical composition than the first chemical composition, the second chemical composition including cations corresponding to one of the chemical elements of the first chemical composition; and
        a second layer at least partially covering a peripheral portion of the first layer, wherein the second layer has a third chemical composition that is a different chemical composition than the first and second chemical compositions, the third chemical composition including cations corresponding to one of the chemical elements of the first chemical composition,
    wherein the bonding matrix is prepared from a porous solid body, the porous solid body comprises a plurality of precursor particles, the precursor particles have a mean particle size of less than 70 μm, and the precursor particles are transformed into the bonding elements,
    wherein the core comprises at least one synthetic formulation having chemical elements M, Me, and O (oxygen) and/or OH group, M is an alkaline earth metal selected from calcium or magnesium, and Me is selected from a group of metals consisting of silicon, titanium, aluminum, phosphorous, vanadium, tungsten, molybdenum, gallium, manganese, zirconium, germanium, copper, niobium, cobalt, lead, iron, indium, arsenic and tantalum,
    and
    wherein the filler material comprises:
        a first plurality of first size particles and a second plurality of second size particles, the second size particles being substantially larger in size than the first sized particles, and wherein the bonding matrix, the first size particles and the second size particles are arranged such that the composite material forms a hierarchic structure.

2. The composite material of claim 1, wherein cations associated with the second and third chemical compositions comprise alkaline earth metals.

3. The composite material of claim 1, wherein the cations associated with the second and third chemical compositions are selected from $Ca^{+2}$ and $Mg^{+2}$.

4. The composite material of claim 1, wherein the core is equiaxed, elliptically-shaped, flake-shaped, or fiber-shaped.

5. The composite material of claim 1, wherein the core comprises $CaSiO_3$ or $MgSiO_3$.

6. The composite material of claim 1, wherein the first layer comprises an oxide or a hydroxide of aluminium, silicon, or iron.

7. The composite material of claim 1, wherein the second layer is composed of a carbonate phase which bonds with one or more of: limestone, marble dusts, calcium carbonate rich aggregates, gypsum, sand and silica rich aggregates, or combinations thereof.

8. The composite material of claim 1, wherein the bonding matrix is porous.

9. The composite material of claim 1, wherein at least some of the bonding elements are in contact with one another.

10. The composite material of claim 1, wherein the bonding matrix comprises a hydrate-free cementitious bond.

11. The composite material of claim 1, wherein the bonding matrix is substantially arranged in porous spaces between adjacent first size particles, and wherein the adjacent first size particles are arranged in porous spaces between adjacent second size particles.

12. The composite material of claim 1, wherein the composite material has a Vicker's hardness between about 1 GPa and 30 GPa.

13. The composite material of claim 1, wherein the composite material has a compressive strength varying between 14 to about 3,000 MPa and a flexural strength of less than about 380 MPa.

14. The composite material of claim 1, wherein the composite material exhibits creep strain of less than $60 \times 10^{-6}$/psi.

15. The composite material of claim 1, wherein the composite material exhibits $Cl^-$ permeability of less than 700 C.

16. The composite material of claim 1, wherein the composite material is self reinforced and has a ball impact resistance greater than 6 J.

17. The composite material of claim 1, wherein the composite material is reinforced with steel fibers and has a ball impact resistance greater than 10 J.

18. The composite material of claim 1, wherein the composite material has a thermal conductivity of greater than about 0.13 W/mk, and less than about 196 W/mk.

19. The composite material of claim 1, wherein, the composite material exhibits at least one of the following properties:
  (i) modulus of elasticity of at least 4.04×106 psi;
  (ii) split tensile strength of at least 390 psi;
  (iii) average wear of less than 1.00 mm using ASTM C 944;
  (iv) freeze-thaw resistance of at least 300 cycles by ASTM C666;
  (v) visible scaling resistance of x<1 when testing using ASTM C672;
  (vi) negligible shrinkage measured by ASTM C157; and
  (vii) negligible alkali-silicate reaction.

20. The composite material of claim 1, wherein the composite material has a thermal expansion coefficient between $3 \times 10^{-6}$/° C. and $15 \times 10^{-6}$/° C.

21. The composite material of claim 1, wherein the composite material has a heat capacity between 6 and 900 J/mole·K.

22. The composite material of claim 1, wherein the composite material has a reflectivity coefficient between 0.04 and 0.9.

23. The composite material of claim 1, comprising a porosity of about 1 to about 70 vol. %.

24. The composite material of claim 1, comprising a porosity about 1 to about 10 vol. %.

25. The composite material of claim 1, comprising a porosity of about 50 to about 70 vol. %.

26. The composite material of claim 1, wherein the bonding matrix comprises a volume fraction of about 8 to about 30 vol. %.

* * * * *